(12) United States Patent
Pekarek et al.

(10) Patent No.: US 8,789,426 B1
(45) Date of Patent: Jul. 29, 2014

(54) SYSTEM AND METHOD OF MEASURING QUASI-STATIC FORCE WITH A PIEZOELECTRIC SENSOR

(75) Inventors: Steven D. Pekarek, West Lafayette, IN (US); Kevin A. Rosenbaum, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 471 days.

(21) Appl. No.: 13/210,106

(22) Filed: Aug. 15, 2011

Related U.S. Application Data

(62) Division of application No. 12/119,469, filed on May 12, 2008, now Pat. No. 7,997,144.

(60) Provisional application No. 60/917,492, filed on May 11, 2007.

(51) Int. Cl.
*G01B 7/16* (2006.01)

(52) U.S. Cl.
USPC .......................................................... 73/777

(58) Field of Classification Search
USPC .......................................................... 73/777
See application file for complete search history.

(56) References Cited

U.S. PATENT DOCUMENTS

| | | | |
|---|---|---|---|
| 5,220,836 A * | 6/1993 | Harms et al. | 73/702 |
| 5,494,043 A | 2/1996 | O'Sullivan et al. | |
| 6,674,262 B2 | 1/2004 | Kitajima et al. | |
| 6,988,993 B2 | 1/2006 | Sullivan et al. | |
| 7,026,779 B2 | 4/2006 | Eba | |
| 7,104,139 B2 | 9/2006 | Gao et al. | |

OTHER PUBLICATIONS

"How many different types of force transducer are there?" [online] undated, [retrieved May 14, 2008.] Retrieved from the Internet: <http://www.npl.co.uk/server.php?show=ConWebDoc.2116>.

Baudendistel, T. et al., "A Novel Inverse-Magnetostrictive Force Sensor," *IEEE Sensors Journal*, vol. 7, No. 2, Feb. 2007, pp. 245-250.

Beccue, J., et al., "Utilization of Piezoelectric Polymer to Sense Harmonics of Electromagnetic Torque," *IEEE Power Electronics Letters*, vol. 1, No. 3, Sep. 2003, pp. 69-73.

Pekarek, S. et al., "Using Torque-Ripple-Induced Vibration to Determine the Initial Rotor Position of a Permanent Magnet Synchronous Machine," *IEEE Transactions on Power Electronics*, vol. 21, No. 3, May 2006, pp. 818-821.

Measurement Specialties, Inc., "Piezo Film Sensors Technical Manual", [online] Mar. 15, 2006, [retrieved Jan. 22, 2007]. Retrieved from the Internet: <http://www.meas-spec.com/myMeas/download/pdf/english/piezo/techman.pdf>.

Kistler Corporation, "Piezoelectric Theory," [online] undated. Retrieved from the Internet: <http://www.kistler.com/medias/ux9V0DIw5FZxP85D8YwBEd-30.pdf>.

(Continued)

*Primary Examiner* — Lisa Caputo
*Assistant Examiner* — Octavia D. Hollington
(74) *Attorney, Agent, or Firm* — Maginot, Moore & Beck LLP

(57) ABSTRACT

A system and method employing a piezoelectric sensor for quasi-static force measurement substantially free of drift and with improved low-frequency response. The output signal from the sensor is sampled and integrated using digital techniques that include a drift compensation algorithm. The algorithm continually monitors the sensor output and estimates bias errors that will cause the output to drift.

12 Claims, 28 Drawing Sheets

(56) References Cited

OTHER PUBLICATIONS

Trout Cove Lutherie, "Interface Circuits," [online] undated, [retrieved May 12, 2008]. Retrieved from the Internet: <http://tclutherie.hypermart.net/interface>.

GlobalSpec.com Technical Library, "The Piezoelectric Effect, Theory, Design and Usage," [online] undated, [retrieved May 12, 2008]. Retrieved from the Internet: <http://www.designinfo.com/kistler/ref/tech_theory_text.htm>.

Wuchinich, Dave, "Current-mode Instrumentation Amplifier Enhances Piezoelectric Accelerometer," [online], Nov. 23, 2006, EDN.com, [retrieved May 14, 2008]. Retrieved from the Internet: <http://www.edn.com/index.asp?layout=article&articleid+CA6391432>.

Beccue, Philip et al., "Measurement and Control of Torque Ripple-Induced Frame Torsional Vibration in a Surface Mount Permanent Magnet Machine," *IEEE Transactions on Power Electronics,* vol. 20, No. 1, Jan. 2005, pp. 182-191.

\* cited by examiner

SYSTEM AND METHOD OF MEASURING QUASI-STATIC FORCE WITH A PIEZOELECTRIC SENSOR

CROSS-REFERENCE TO RELATED APPLICATIONS

This application is a division of patent application Ser. No. 12/119,469, filed May 12, 2008, now U.S. Pat. No. 7,997,144, which claims the benefit of U.S. Provisional Patent Application No. 60/917,492, filed May 11, 2007, which applications and patent are hereby incorporated by reference along with all references cited therein.

GOVERNMENT RIGHTS

This invention was made with government support under Contract/Grant No. FA8750-04-1-2409 awarded by the Air Force Research Laboratories. The government has certain rights in the invention.

FIELD OF THE INVENTION

This invention relates generally to systems and methods for measuring force, and more particularly to the measurement of force, especially quasi-static force, with piezoelectric sensors.

BACKGROUND OF THE INVENTION

There are several methods that are traditionally used to measure force. These include resistive, foil, semiconductor, wire and thin film strain gauges as well as hydraulic and pneumatic load cells. Of these, most are indirect—i.e. the sensor itself is not in contact with the force. Rather, the sensing element is placed remote from the force, but is positioned in such a way that it undergoes change in response to the force. For example, the resistive strain gauge load cell has a resistance in the cell that changes with deflection of a mechanical component. As is common to all indirect techniques, placement of the indirect sensor is critical. In contrast to the indirect method, a sensor that is capable of measuring force directly has significant benefits. These include placement of the sensing device anywhere the force is transmitted.

The use of piezoelectric materials to measure force has several potential advantages. They are relatively inexpensive compared to load cells, they measure force directly, and are they are easy to form into a wide variety of shapes and sizes. Sensors for large panels the size of a basketball backboard or a small circular ring are readily achieved. They are extremely robust and can measure over a very large range with precise linear response. Finally, these sensors have excellent high frequency responses due to their high natural frequencies.

In general, piezoelectric materials have not been applied for applications in which force is applied for periods of time of many seconds/minutes. This is in large part due to required integration that is necessary to convert voltage from the sensor to a value of force. Analog based circuits constructed for the integration have tended to drift-leading to large sensor errors.

In a piezoelectric material, as a first approximation, the charge produced is linearly proportional to the applied stress or force:

$$Q \propto \text{Force} \qquad (1)$$

The most prevalently used materials that exhibit strong piezoelectric properties are quartz crystal, tourmaline, gallium orthophosphate, certain ferroelectric ceramics such as lead-zirconite-titanate (PZT), and special polymer films such as polyvinylidene fluoride (PVDF). An actuator makes better use of PZT due to its larger strain constant. On the other hand, PVDF film is better used in sensor applications with its relatively larger stress constant. PVDF, or piezoelectric film, is a thin plastic polymer. It can be purchased in sheets and custom cut to the desired shape and size.

A few circuit models are provided to set forth the operation and use of piezoelectric devices. FIG. 1 is a representation of a piezoelectric film material in which an applied force is shown that compresses the thickness portion of the device. As a result of polarization, positive and negative charges develop at the opposing conductor surfaces respectively.

The equivalent circuit in FIG. 2 shows a charge source that is defined to be proportional to the applied force. The capacitor is inherent to the device, functions as a storage device since it is the location of the electric field, and will present a voltage equal to charge divided by the capacitance. Electrically speaking, a piezoelectric sensor is a capacitor with the piezoelectric element acting as a dielectric. Because the dielectric exhibits a piezoelectric effect, a piezoelectric sensor can be considered as an active capacitor that charges itself when mechanically loaded. The resistance is due to the non-zero conductivity of the dielectric. Therefore, the voltage present across the terminals of a piezoelectric device will always decay to zero. This is one of the few reasons that true dc measurement of force is not possible using piezoelectric sensors.

A charge source is not a typical circuit element. Therefore, it is more convenient to use a standard voltage or current source. Since the definition of current is the time rate flow of charge, one can simply substitute the charge source for a dependant current source. FIG. 3 shows this modification. The short circuit current is proportional to the time derivative of charge as in Equation (2).

$$I_{sc} \propto \frac{d}{dt} Q(t) \qquad (2)$$

From Equation (1), the current and applied force can be related as $$I_{sc} \propto \frac{d}{dt} \text{Force} \qquad (3)$$

The output of any piezoelectric material due to stress or strain is electric charge. Charge can be a difficult quantity to measure and conceptualize compared to voltage or current. Another difficulty is that the quantity of charge realized is in the $10^{-12}$ coulomb (C) range.

Since charge produced by a piezoelectric sensor is relatively small, direct connection to a volt meter, analog-to-digital converter or even an oscilloscope is not practical. The combined resistance of the sensor, cabling, and measurement device loads the sensor and causes an amplitude loss and phase shift.

An electrometer amplifier is a very sensitive voltage amplifier specifically designed to make very high impedance measurements. FIG. 4 shows a piezoelectric sensor connected to an electrometer amplifier using a coaxial cable. For use with piezoelectric sensors, a gain of 1 is common. The amplifier allows a voltage to increase across the sensor as opposed to subsequent amplifiers. Its output is proportional to the sensor voltage, and is capable of driving lower impedance loads. Thus, the amplifier is an impedance buffer.

A range capacitor, $C_r$, is usually placed in parallel with the sensor to obtain different sensitivities or measuring ranges for the system. This is due to the fact that the voltage developed across the total capacitance of the input is related to the ratio of charge divided by capacitance. Increasing the range capacitor lowers the input voltage for a given applied force to the sensor. This is done to limit the voltage present at the input terminals of the amplifier so that the amplifier operates in its linear region.

The reset switch that is also in parallel with the sensor is used to discharge or "reset" the output to zero. In practice, a small valued resistor is usually placed in series with the switch to prevent dead shorting the capacitor. This switch allows the initial output voltage to be zeroed independent of the current applied load. The amplifier can be reset with half the rated force on the sensor. Then small perturbations on top of this would respond just as linearly as if there were no load on the sensor.

Electrometer amplifiers are prone to several disadvantages. The sensitivity of the output is not inversely proportional to the range capacitor. This is due to the fact that the sensor and cable capacitance also contribute to the total capacitance. Therefore, doubling the value of the range capacitor does not cut the sensitivity in half. It is also bothersome that any voltage developed across the sensor will decay due to leakage resistance. For the output to not drop appreciably over long time periods, equivalent leakage resistances in the hundreds of TΩ are required. The leakage resistance of the cable can also change with age and use. It is therefore not an ideal solution for quasi-static measurements.

A charge amplifier makes a significant improvement in charge measurement. The charge amplifier has had a significant impact on the practicality of using piezoelectric sensors. The term charge amplifier is actually a misnomer as the charge developed by the sensor is not amplified. Instead, the charge produced is converted to a proportional voltage. Here and elsewhere however, charge amplifier is the commonly accepted name.

An ideal charge amplifier is shown in FIG. 5. An operational amplifier is configured as an integrator using a negative capacitive feedback. Assuming that the op amp is ideal, the voltage potential from the inverting to non-inverting input is zero. This implies that the voltage across the sensor is zero. Using Kirchhoff's current law at the inverting input $$I_{piezo} + I_C + I_{input} = 0 \quad (4)$$

Ideally, the input current of the op amp is zero. The current developed from the sensor will be the short circuit current determined in Equation (2). The capacitor current is then $$I_C(t) = -\frac{dQ(t)}{dt} \quad (5)$$

Since the inverting input is virtually referenced to ground, the output of the circuit is equal and opposite the voltage present on the feedback capacitor. The output voltage is therefore $$V_{out}(t) = -\frac{1}{C_r}\int I_C(t)dt = -\frac{Q(t)}{C_r} + V_{I.C.} \quad (6)$$

Thus, the charge amplifier integrates the short circuit current developed by the sensor.

The second term in Equation (6) represents the initial condition or voltage present on the feedback capacitor. Similar to the electrometer, this value can be zeroed by closing a reset switch that is in parallel to the range capacitor. In contrast to the electrometer, the capacitor is part of the feedback and is not in parallel with the sensor.

Charge amplifiers have greatly increased the number of practical applications of piezoelectric sensors, particularly for measuring quasi-static forces. However, despite numerous advantages, charge amplifiers create a host of implementation issues. The most significant is the problem of drift.

Drift in charge amplifiers is defined as the tendency of the output voltage to slowly increase or decrease over time. A drifting output is not a function of the applied stress and is therefore undesirable. Using op amps, drift will continue in either direction until the output is saturated. Drift is a problem for any integrating system exposed to non-zero biased inputs. Presently, there are two methods used to circumvent drift in analog charge amplifiers: a reset switch or a time constant resistor.

The reset switch depicted in FIG. 5 can be closed until the applied force is known to be changing. This stops all integration due to drift, but also forces the output to zero. Another disadvantage to this approach is "operation jump." After the switch is released, it is common for the output to jump or shift in value. Two sources can be blamed for the jump: the operational amplifier's inherent noise and any residual charge on the reset switch.

Therefore, there is a need for a system and method to enable more accurate average force measurement using a piezoelectric material.

SUMMARY OF THE INVENTION

The present invention provides a system and method of measuring quasi-static force with a piezoelectric sensor that eliminates or substantially reduces drift in the measured output. A method according to one aspect of the invention obtains a first signal corresponding to the charge produced by the piezoelectric sensor, samples the first signal and converts the samples to digital values, and calculates force based on the digital values, the calculation including bias estimation using different time constants for different conditions, drift compensation based on the bias estimation, and digital integration of compensated sensor values.

The objects and advantages of the invention will be more apparent upon reading the following detailed description in conjunction with the accompanying drawings.

DETAILED DESCRIPTION OF PREFERRED EMBODIMENTS

Figure 1:
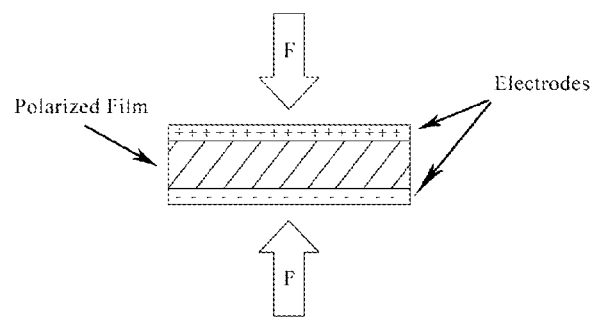
FIG. 1 illustrates a representation of piezoelectric film.
Figure 2:
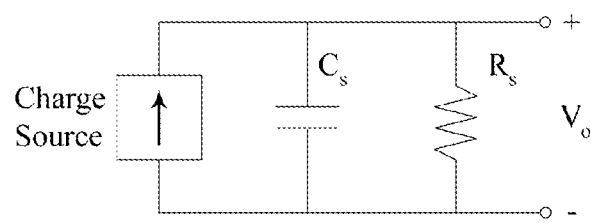
FIG. 2 illustrates a piezoelectric equivalent circuit with a charge source.
Figure 3:
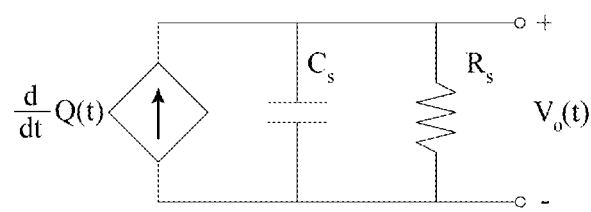
FIG. 3 illustrates a piezoelectric equivalent circuit with a dependent current source.
Figure 4:
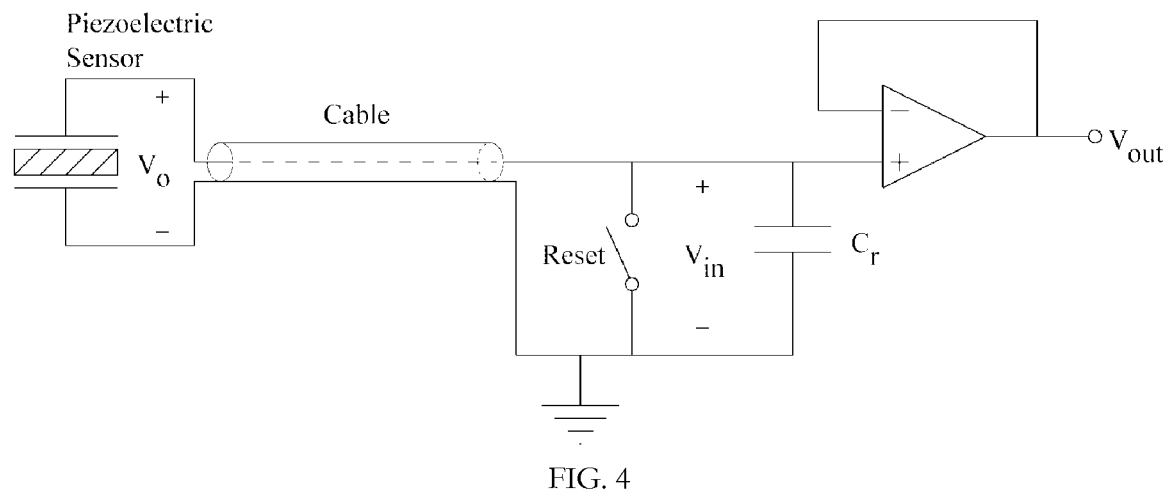
FIG. 4 illustrates an electrometer amplifier measurement chain.
Figure 5:
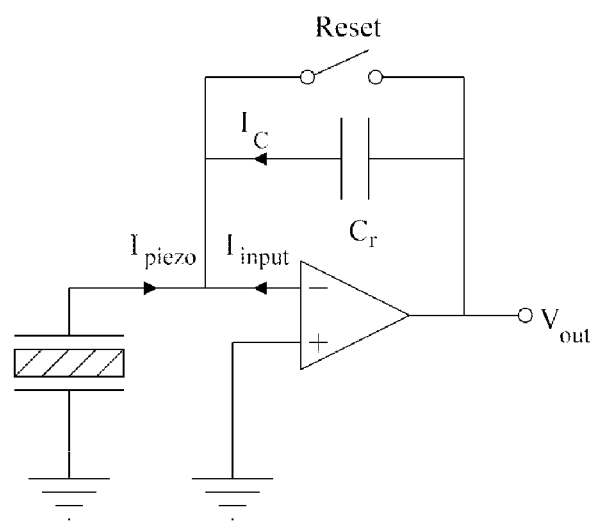
FIG. 5 illustrates a charge amplifier circuit with a reset.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

Figure 6:
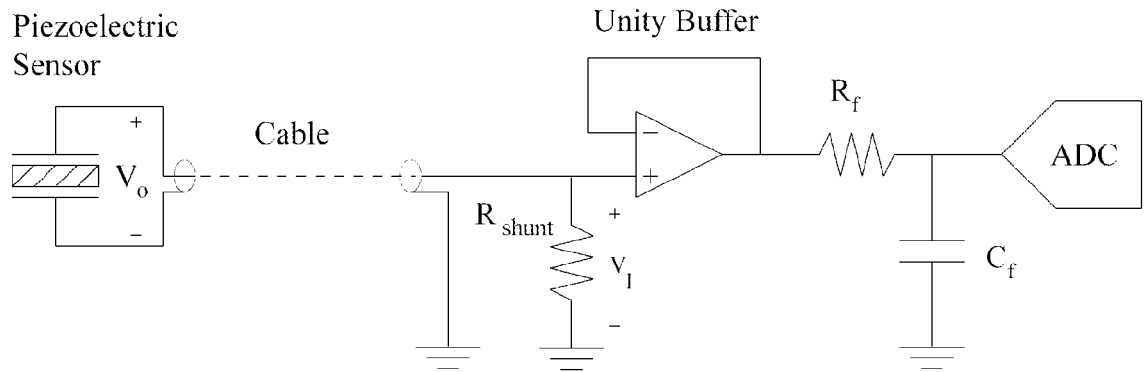
FIG. 6 illustrates a short circuit measurement chain of a digital charge amplifier in accordance with one embodiment of the present invention.

One embodiment of the present invention comprises a charge amplifier, referred to herein as a "digital charge amplifier," which removes the problem of drift in the system output more efficiently than an analog charge amplifier. The digital charge amplifier, or DCA, is so designated because it converts the charge to an equivalent numerical value. The DCA performs integration numerically after digital sampling the short-circuit sensor current or an approximation thereof. More specifically, the DCA passively short-circuits the sensor terminals as shown in FIG. 6. The sensor is not perfectly shorted. Rather, the method employs a shunt resistor as illustrated.

From Equation (3) it can be seen that the short circuit current is proportional to the time derivative of the applied force. Integrating the short circuit current then provides the calculated force as $$F_{calc}(t) = k_I \int I_{piezo}(t) dt + F_{I.C.} \qquad (7)$$

The constant $k_I$ is a gain that is a function of the sensitivity of the piezoelectric sensor, and its value can be found experimentally while calibrating the system. For simplicity here, the continuous time equations are displayed. In actuality, the measured signal is sampled and integrated in discrete time.

If a shunt is used, the above equation can be modified to $$F_{calc}(t) = k_V \int I_f(t) dt + F_{I.C.} \qquad (8)$$

Here, the constant $k_V$ is related to $k_I$ by $$k_V = \frac{k_I}{R_{shunt}} \qquad (9)$$

The second term to the right of the equal signs in Equation (7) and Equation (8) represent the initial condition, or a zero point of reference. The DCA uses lines of code to reset this value. The software algorithm that removes drift is disclosed herein along with the sensitivity of the system.

Measurement of the short circuit current can be accomplished readily using a shunt resistor. From Ohm's Law the current is calculated to be voltage drop across the resistor divided by the resistance FIG. 6 shows an example of the measurement chain. The unity gain op amp provides impedance buffering. The RC network provides a low pass filter to prevent aliasing during sampling with the analog to digital converter (ADC).

Figure 7:
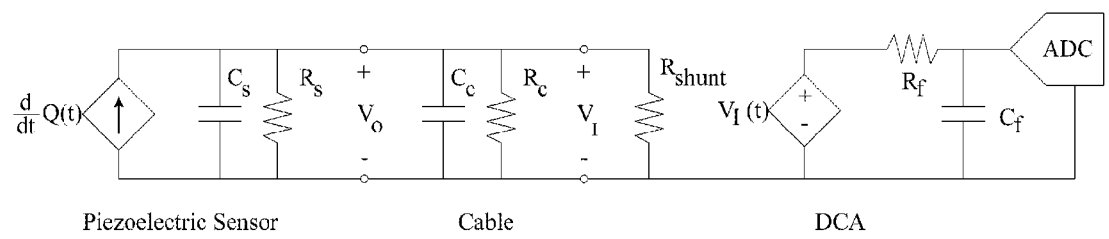
FIGS. 7 and 8 illustrate equivalent circuits of the short circuit measurement chain of FIG. 6.

FIG. 7 represents an approximate equivalent circuit of the measurement chain above including the connecting cable and input impedance of the op amp buffer. The shunt resistor's value should be as small as possible such that the other insulating resistances are insignificant. It must also be large enough to produce a measurable amount of voltage from the very low amount of current.

A shunt resistor may have a value of less than an ohm. However, a value of 100 kΩ proves to be quite satisfactory for the first embodiment disclosed herein. Despite the large resistance, the shunt is still several orders of magnitude smaller in resistance than the insulating resistance of the sensor and cable which is usually in the TΩ range.

Figure 8:
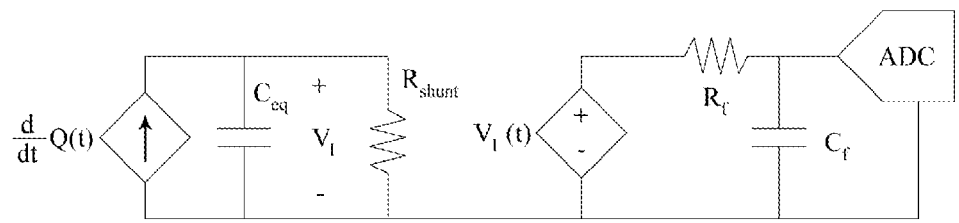

Using the shunt resistor designed to be the only significant resistance, the equivalent model becomes that of FIG. 8. The equivalent capacitance imposes a high frequency roll off with a cut off frequency of $$f_{upper} = \frac{1}{2\pi R_{shunt} C_{eq}} \quad (10)$$

Using a 2 cm square piece of PVDF film with a thickness of 110 μm and a relative permittivity of 12, the sensor capacitance is around 390 pF. With one half meter of coaxial cable with a rating of 100 pF/m, an additional 50 pF is added. The upper cut off frequency in this situation would be around 3.6 kHz. Other high frequency limits such as the sampling rate will define the overall bandwidth of the system. For frequencies well below this cut off however, the voltage, $V_I$, present across the shunt proportionally represents the short circuit current of the sensor.

In order to bring the continuous analog voltage, $V_I$, from FIG. 8 into the discrete digital world, an analog to digital converter, or ADC, is employed. FIG. 6 provides a generic example of an ADC. It is important to note that the sensor produces positive and negative voltages depending upon the sign of the change in force applied. Therefore, the ADC in this figure is required to measure bipolar voltages. If the ADC measures only positive voltages, additional op amps can be inserted before the ADC to apply a dc offset as well as amplify the signal further. Any subsequent dc offset can be removed in software. The Nyquist rate defines a hard limit on the minimum sampling frequency required to fully reconstruct an original signal. In practice, it is difficult to determine the highest frequency component that the sensor is capable of observing. To restrict a maximum frequency before sampling, an RC filter is inserted prior to the ADC as illustrated in FIG. 6 This filter controls the dominant higher frequency limit of the system.

If the sampled signal is directly integrated, the system may be subject to drift. The calculated force applied will either tend to drift up or down independent of the actual force. There are several possible sources that lead to drift, including non-zero input voltage bias of op amp, leakage current on the input device, voltage fluctuations in the power supplying the op amps, and dielectric memory effect in capacitors. In general terms, the drift is caused by bias errors in the input. Small biases may at first seem insignificant, but any small error that is integrated over a long time accumulates.

Bias is estimated and eliminated prior to sensor signal integration. Estimating the bias error superimposed on the measured short circuit current of a piezoelectric sensor in a DCA system can be approached using several different methods. Three methods are provided with the goal of eliminating the problem of drift:
1. LPF Bias Estimator
2. Switched LPF Bias Estimator
3. State Machine Bias Estimator Each of these methods is intended to find $V_{bias}$ in $$F_{calc}(t) = k_I \int (V_I(t) - V_{bias}(t)) dt + F_{I.C.} \quad (11)$$

where $V_I$ is the voltage measured from FIG. 8 The second term to the right of the equal sign is the initial condition that can be reset in software. If the estimated bias is accurate, then the integral will only operate on the signal that is a function of the applied force.

LPF Bias Estimator

Figure 9:
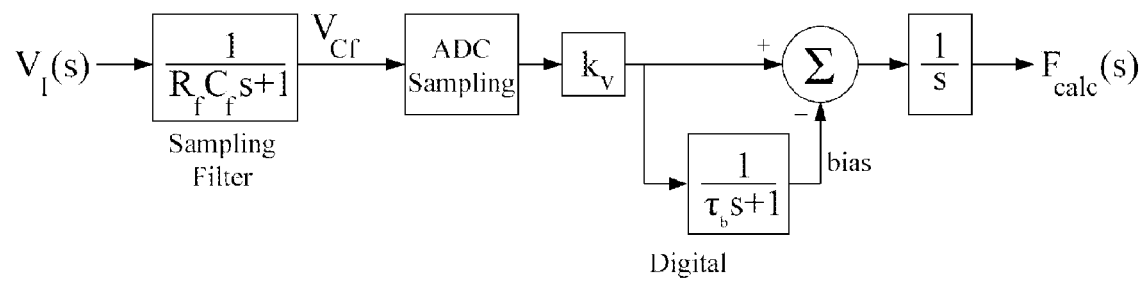
FIG. 9 illustrates a digital charge amplifier with a low pass filter bias estimator.

The simplest estimation of the bias is to consider only the low frequency content of the input signal. This is achieved by inputting the sensor signal into a low pass filter (LPF) that has a very low cut off frequency. When this bias is subtracted from the original signal, only the higher frequency content remains. In this way, the method functions as a high pass filter in order to remove the bias errors. FIG. 9 shows the bias estimator inserted prior to the integrator. The input, $V_I$, represents the short circuit current of the sensor. The first filter is the sampling filter prior to the ADC. The sampled voltage is then scaled by $k_v$ according to Equation (11). From this, the estimated bias value is created using the low pass filter with the time constant $\tau_b$. Last of all, the bias value is subtracted away, and this signal is integrated. It is noted that the block diagram is considered with continuous signals rather than discrete signals for simplicity. This is a reasonable approximation if the signal is sampled fast enough. The transfer function of this system is therefore $$\frac{F_{calc}(s)}{V_I(s)} = \frac{k_v}{R_f C_f s + 1} \left(1 - \frac{1}{\tau_b s + 1}\right) \frac{1}{s} \quad (12)$$

$$= \frac{k_v \tau_b}{(R_f C_f s + 1)(\tau_b s + 1)}$$

It is apparent that $V_I$ in terms of charge is $$V_I(s) = R_{shunt} s Q(s) \quad (13)$$

Substituting $Q(s)$ in place of $V_I$ in Equation (12) produces the overall transfer function of $$\frac{F_{calc}(s)}{Q(s)} = \frac{s R_{shunt} k_v \tau_b}{(R_f C_f s + 1)(\tau_b s + 1)} \quad (14)$$

Figure 10:
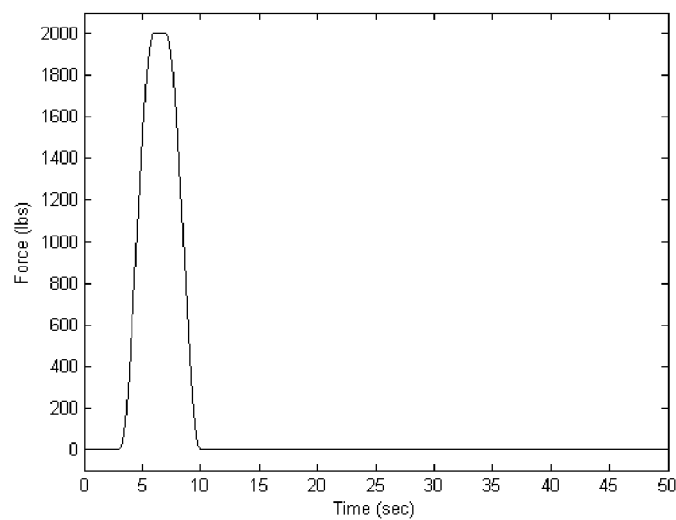
FIG. 10 illustrates a simulated applied force.
Figure 11:
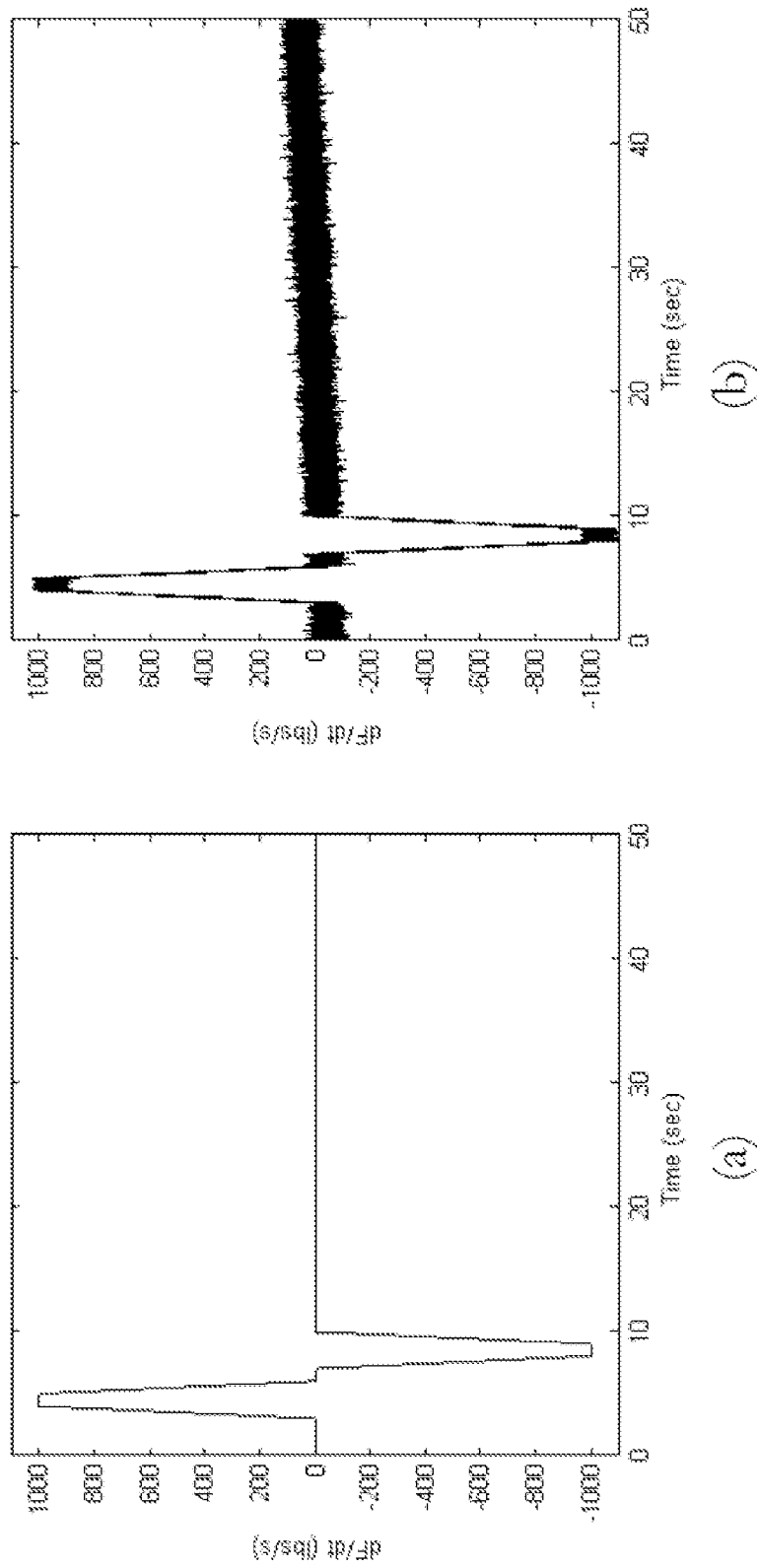
FIG. 11a illustrates a original time derivative of a simulated applied force.
FIG. 11b illustrates a corrupted time derivative of a simulated applied force.

This method provides a basis for comparison with the other bias estimation methods described herein. A simulated load force was used to test the performance of the various bias estimation methods. A ramp up to 2,000 lbs and then ramp down to zero is depicted in FIG. 10 The force is then held constant at zero for a remaining 40 seconds. The sampling rate is 1 kHz. The time derivative of this signal is then shown in FIG. 11a. A pure integration of the signal in FIG. 11a would yield the original force from FIG. 10 FIG. 11b shows the signal corrupted using a Gaussian random noise with a standard deviation of 25 lbs/s and a constant increasing slew rate of 2 lbs/s/s. The relatively high slew rate helps to accentuate the performance differences between the bias estimation methods.

Figure 12:
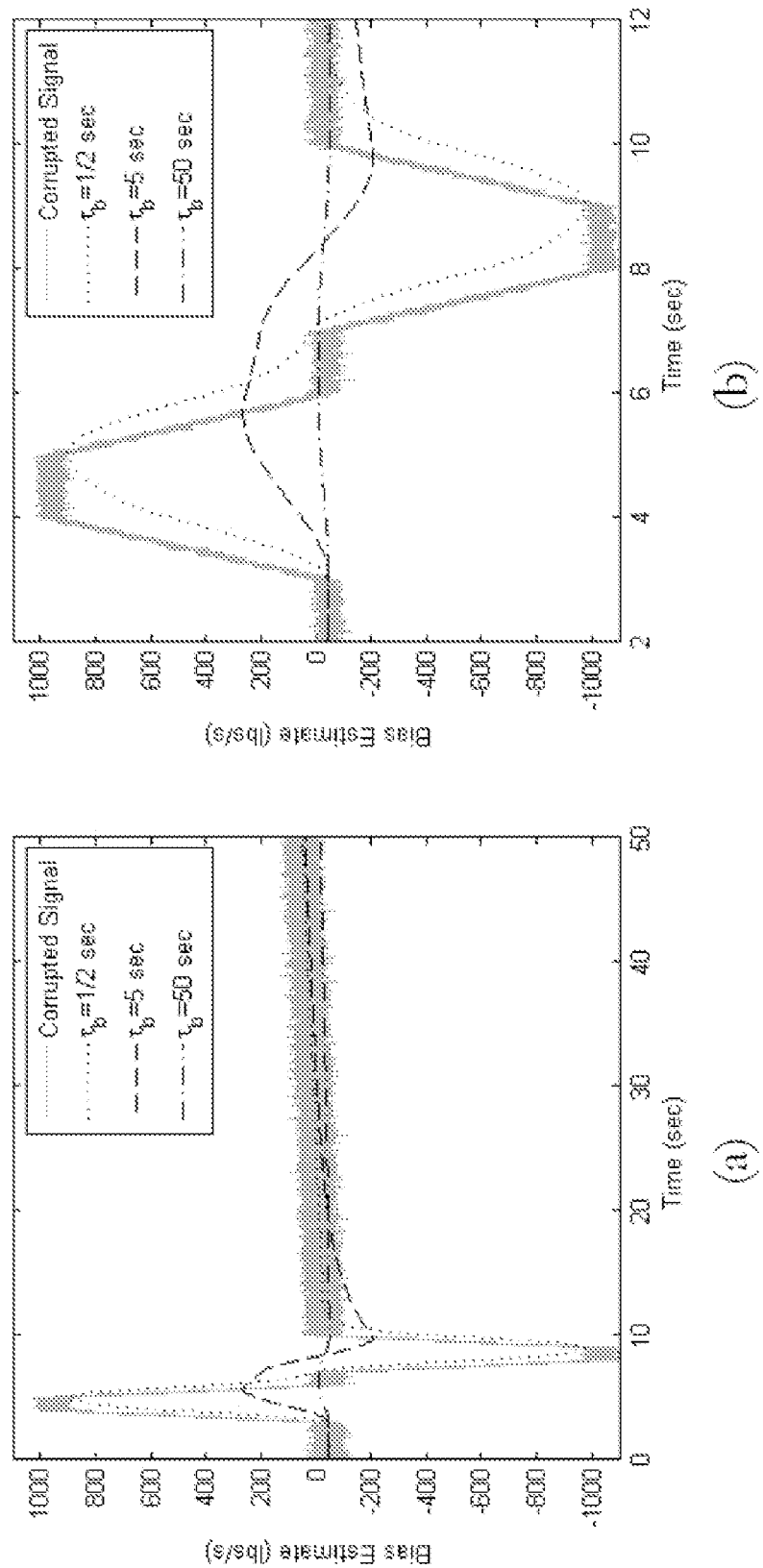
FIG. 12a illustrates whole bias estimations for a low pass filter method.
FIG. 12b illustrates zoomed-in bias estimations for a low pass filter method.

The low pass filtered signals of the corrupted piezoelectric sensor current are shown in FIG. 12a. FIG. 12b shows a zoomed in view with respect to time. Three different time constants of ½, 5 and 50 seconds were selected for $\tau_b$. For the sampling rate of 1 kHz, these values correspond to 500, 5 k and 50 k samples, respectively. With a shorter time constant, the bias estimate more closely follows the actual bias slew, but it is heavily affected by the transient conditions of the actual load force. Longer time constants are not as affected by transient applied forces, but poorly track the actual bias.

Figure 13:
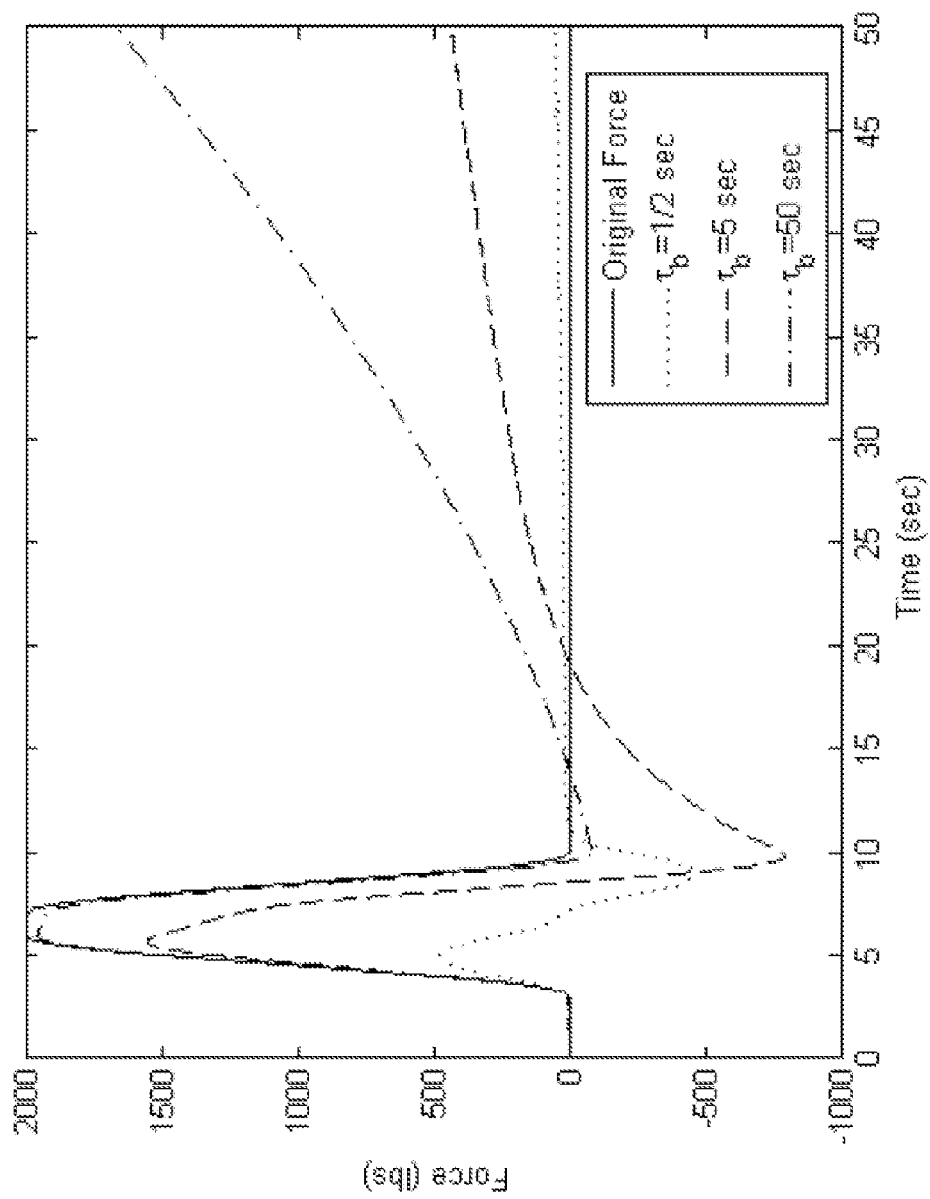
FIG. 13 illustrates a calculated force using a low pass filter method.

FIG. 13 displays the resulting calculated force using Equation (11). The long time constant provides the best transient response but suffers a significant drift. The short time constant gives the least amount of drift in the output but has a relatively poor transient response.

That is, the shorter time constant provides great bias error estimation, but the long time constant is better for calculating transients. Thus, it is preferable to use a long constant during transitions and a short one otherwise.

Switched LPF Bias Estimator

For any time constant using the LPF method above, the bias estimate is affected by the transient conditions due to the applied load. However, if the transients can be detected, a different time constant can be switched in place to provide better bias estimation during these transitions.

If one lets a transient in the short circuit piezoelectric current be defined as a significantly large amplitude change in the signal compared to the random noise and slew that corrupts it, then detection of a transient involves watching for signals that leave a user defined noise margin. Equation (15) defines the difference to be the absolute value of the measured piezoelectric current minus the present bias estimate.

$$\text{diff}(t) = |V_I(t) - V_{bias}(t)| \quad (15)$$

Equation (16) is used to select which time constant should be used for $\tau_b$. The noise margin is represented as NM.

$$\tau_b(t) = \begin{cases} \tau_1, & \text{diff}(t) > NM \\ \tau_2, & \text{diff}(t) < NM \end{cases} \quad (16)$$

Figure 14:
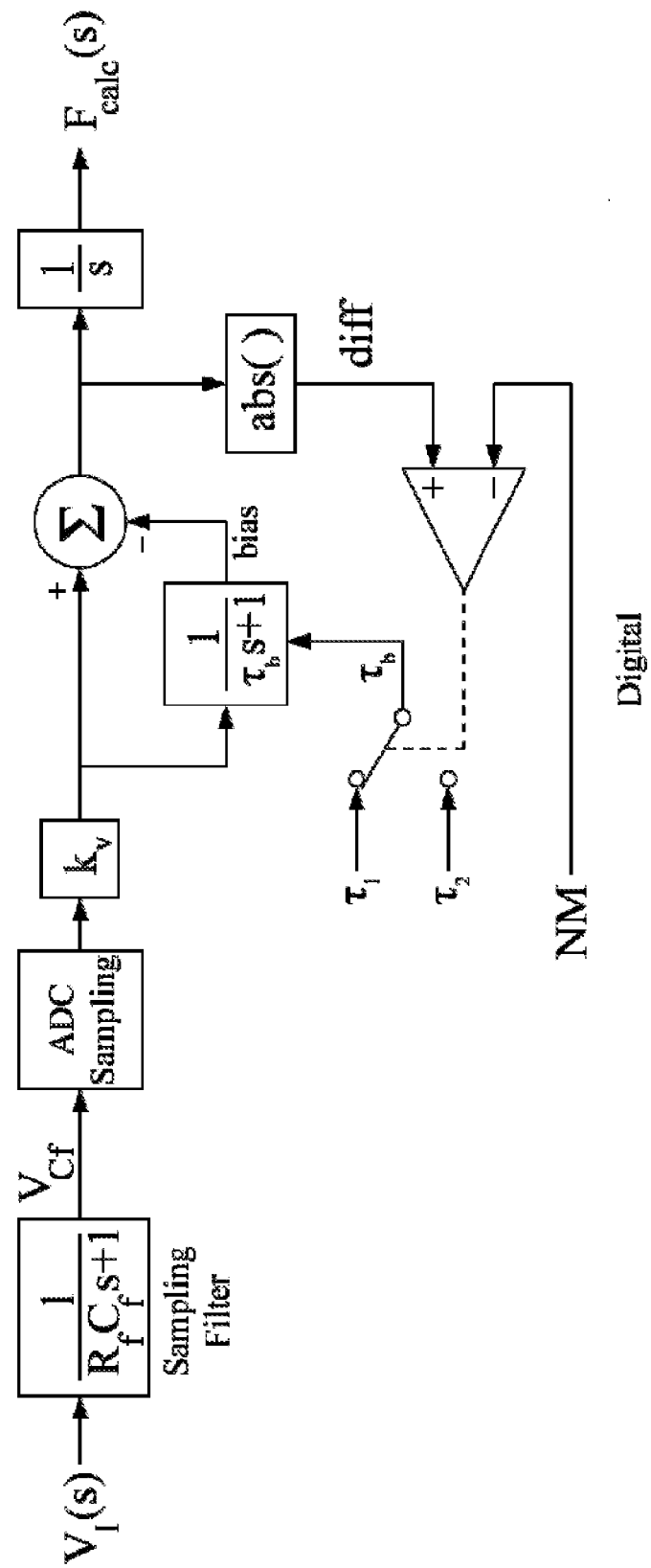
FIG. 14 illustrates one embodiment of a digital charge amplifier with a switched low pass filter bias estimator in accordance with the present invention.

The short time constant, $\tau_2$, can be optimized to track the bias and produce an acceptable amount of drift. Drift is not completely eliminated using this method, but can be significantly attenuated. The long time constant, $\tau_1$, is set very long, and may be set to infinity. This means the bias value does not change at all during a transition period. FIG. 14 combines the switched LPF bias estimator with the DCA.

Figure 15:
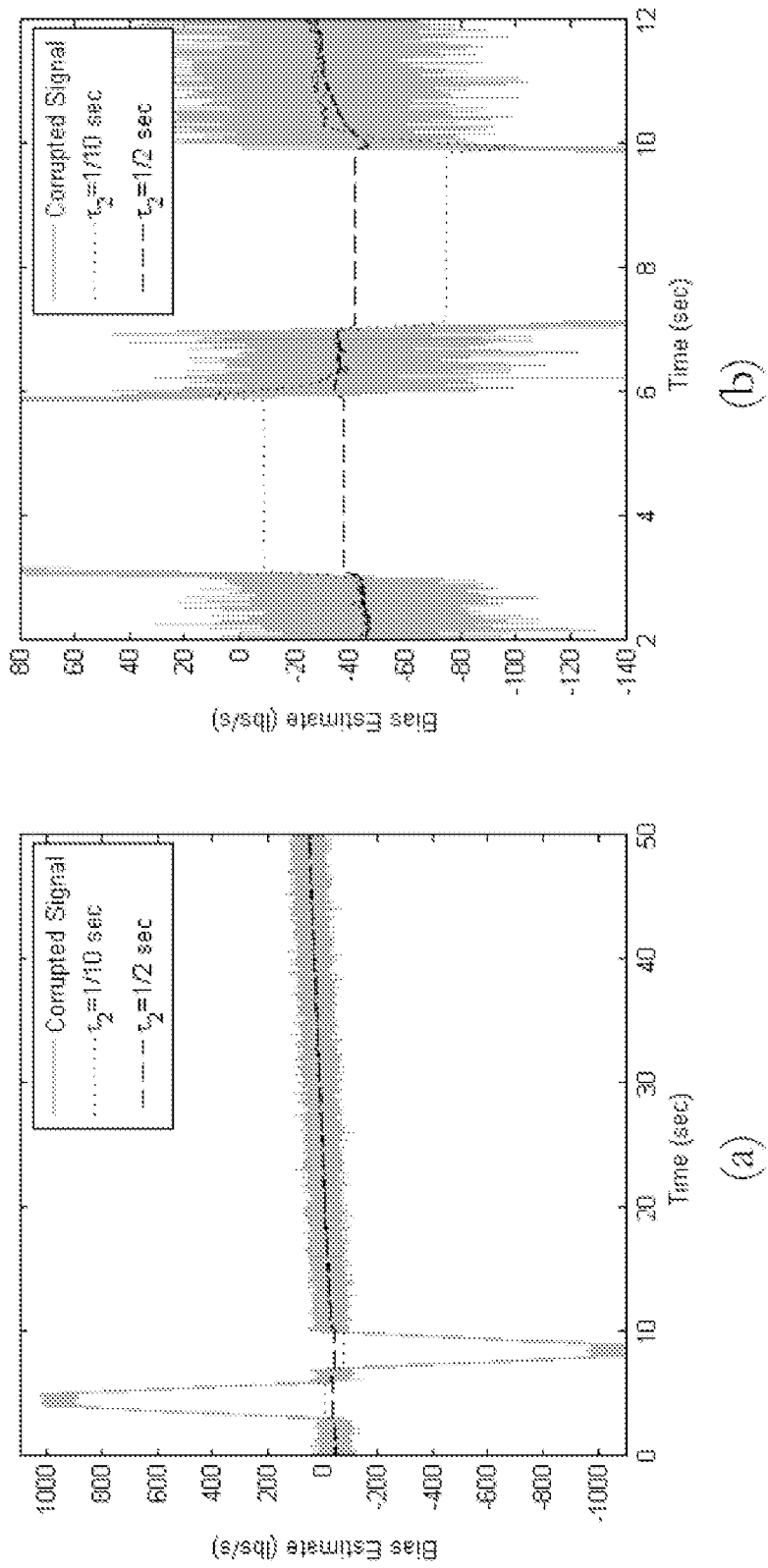
FIG. 15a illustrates a whole bias estimation for a switched low pass filter method.
FIG. 15b illustrates a zoomed-in bias estimation for a switched low pass filter method.

An improved bias estimate is shown in FIG. 15a. FIG. 15b is a zoomed in view with respect to time. It can be seen that the bias estimate does a much better job at following the slew rate through the transients than the LPF method did in FIG. 12. Even with a time constant of 50 seconds, the normal LPF method had a large overshoot in its bias estimation during the transients.

Figure 16:
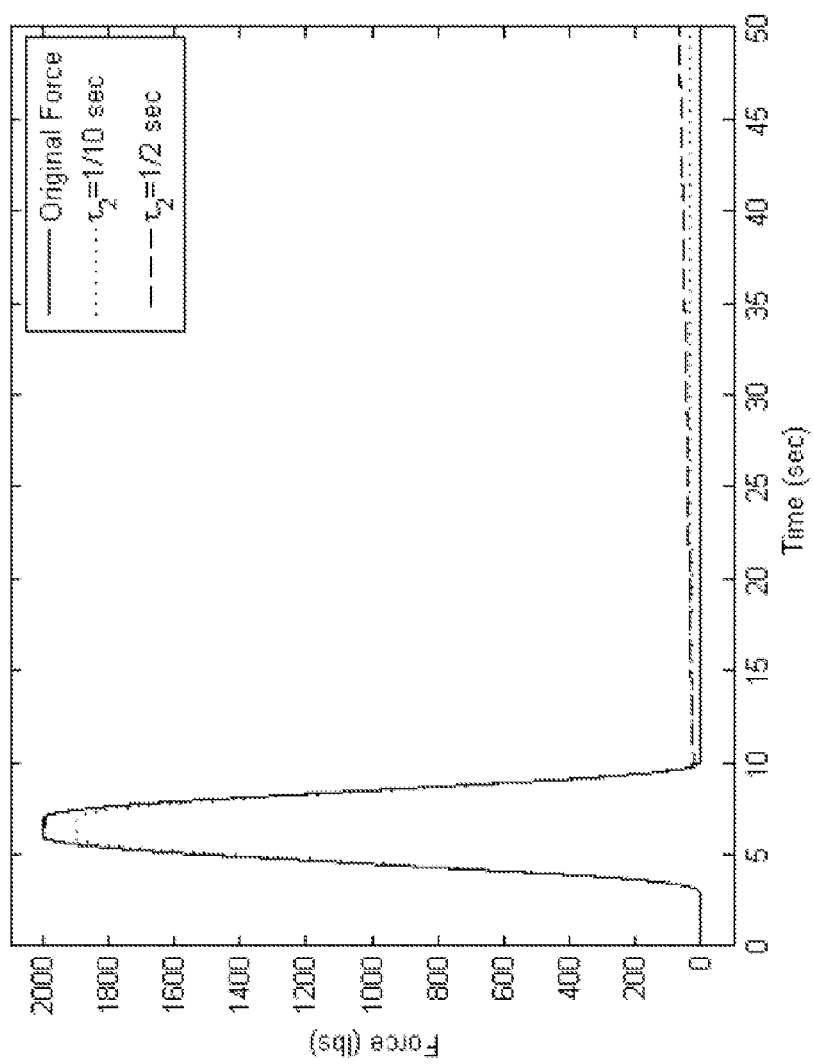
FIG. 16 illustrates a calculated force using a switched low pass filter method.
Figure 17:
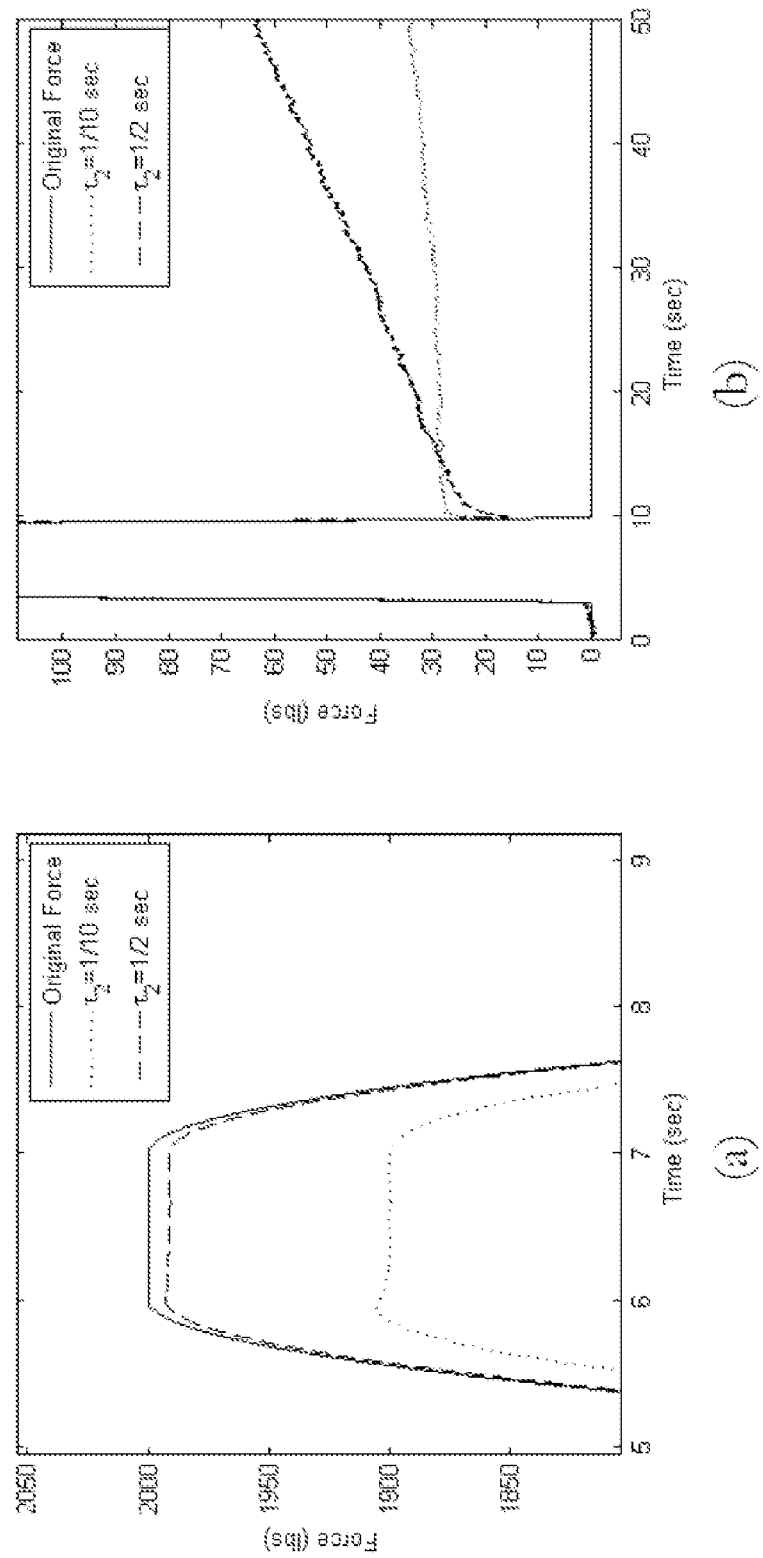
FIG. 17a illustrates a whole calculated force using a switched low pass filter method.
FIG. 17b illustrates a zoomed-in calculated force using a switched low pass filter method.

After integration, FIG. 16 shows the calculated force over the whole time period studied while FIG. 17a and FIG. 17b show zoomed-in views. Two different time constants for $\tau_2$ are studied. Each one provides significant improvements in calculating the force compared to the regular LPF method shown in FIG. 13.

From FIG. 17a one can observe that the longer time constant produces a better transient response than the shorter one. It can be seen from FIG. 15b that the shorter time constant bias estimation jumps up quickly before transferring to $\tau_1$. This produces a larger offset to the integrator which yields a lower calculated peak force shown in FIG. 17a.

FIG. 17b tells a different story in that the shorter time constant for $\tau_2$ performs better. The drift rate is much shallower, but is still prevalent. Both values also have a force error starting at 10 seconds before drifting. This can be accounted for by the lack of bias tracking during the force transients. If the slew noise was negative going, then the force offset would be negative when time is at 10 seconds, and then the output would drift negative instead.

It can be appreciated from the above that the switched LPF method contributes to a substantial improvement in force calculation over the normal LPF method by introducing two dynamically selectable time constants. With this method, however, the drift is not eliminated when exposed to a constant slew.

State Machine Bias Estimator

The state machine bias error estimation method presented here is a modification of the switched LPF method. The switched LPF method compromises between a $\tau_2$ time constant that produces good transient responses and one that yields minimal steady state drift qualities. Although the drift may be minimized, it is not stopped completely. The state machine method removes the drift problem completely while maintaining an excellent transient response. It does this in three ways. First, it determines in a better way when to transition between $\tau_1$ and $\tau_2$. Second, it stops all integration while the force is assumed constant. Finally, it keeps a record of previous values of the estimated bias. This is beneficial when transitioning back to the idle condition where the force no longer changes.

Figure 18:
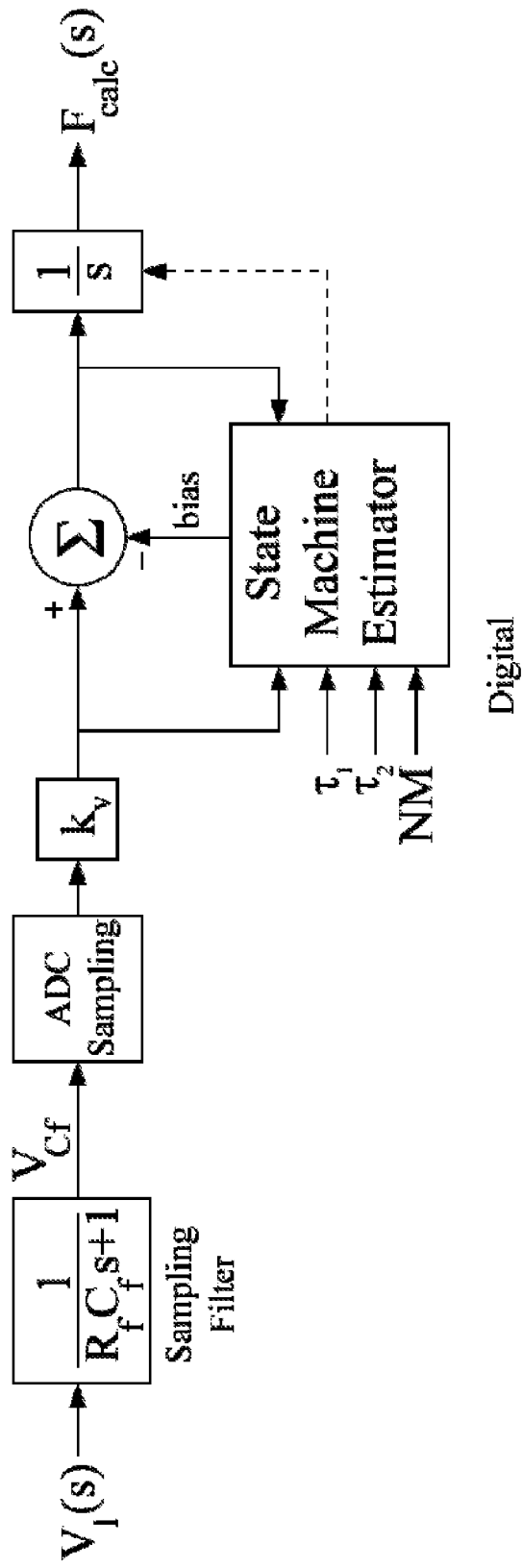
FIG. 18 illustrates one embodiment of a digital charge amplifier block diagram with a state machine bias estimator in accordance with the present invention.
Figure 19:
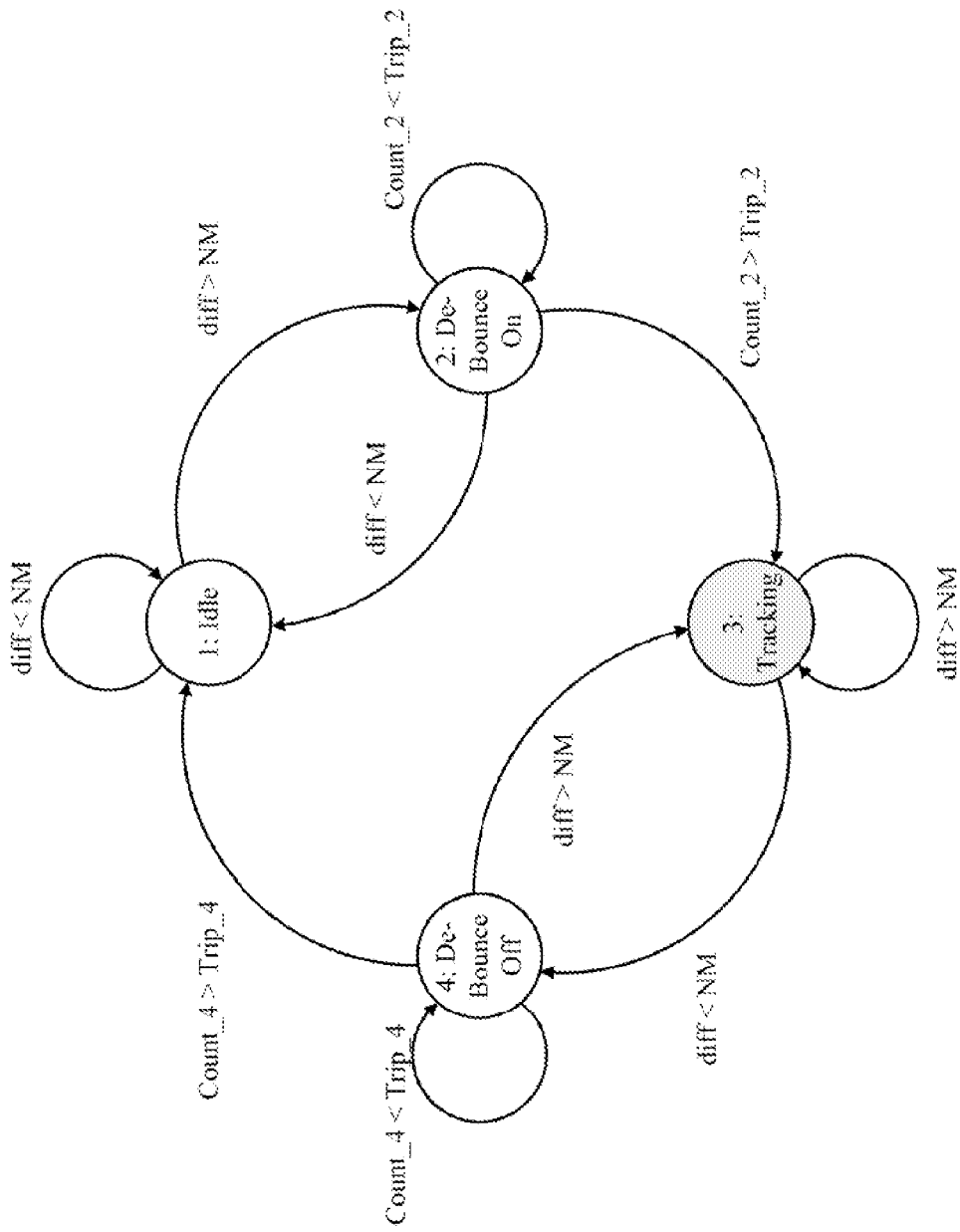
FIG. 19 illustrates a state machine diagram for state machine bias estimation.

The state machine method, whose block diagram is outlined in FIG. 18, operates in four different states or modes of operation. A diagram of the states is shown in FIG. 19 with its corresponding next state equations and state functions described in Table 1 and Table 2.

TABLE 1

Next state conditions for state machine method

| Present State | Possible Next State | Next State Conditions |
| --- | --- | --- |
| 1 | 1 | $V_1$ < Noise Margin |
|   | 2 | $V_1$ > Noise Margin |
| 2 | 1 | $V_1$ < Noise Margin |
|   | 2 | Counter_2 < Trip_2 |
|   | 3 | Counter_2 > Trip_2 |
| 3 | 3 | $V_1$ > Noise Margin |
|   | 4 | $V_1$ < Noise Margin |
| 4 | 1 | Counter_4 > Trip_4 |
|   | 3 | $V_1$ > Noise Margin |
|   | 4 | Counter_4 < Trip_4 |

TABLE 2

State functions for state machine method

| State | Update bias using LPF | Counter Integrate handling | | Special functions |
| --- | --- | --- | --- | --- |
| 1 | Yes | No | Reset Counter_2 | Record Bias Value |
| 2 | No | No | Increment Counter_2 | Recall Previous Bias Value |
| 3 | No | Yes | Reset Counter 4 | Recall Previous Bias Value |
| 4 | No | Yes | Increment Counter_4 | Recall Previous Bias Value |

The two primary states, 1 and 3, are similar to the two states of the switched LFP bias estimation method. The additional two states, 2 and 4, deal with transitioning between states 1 and 3. State 1 is the idle state where force is assumed to be constant. The bias value is estimated to be the low pass filtered value of the input signal using the time constant $\tau_2$. In this state no integration takes place, therefore drift occurs due to phase shifts in the bias estimation or numerical round off. State 3 is the opposite. Integration takes place and the time constant of the bias estimator switches to $\tau_1$. As before, $\tau_1$ can be chosen to be infinity such that the bias value is no longer updated, but instead is frozen. Therefore, integration only takes place when transients occur, and bias estimation only updates when there are no force transients.

States 2 and 4 are de-bouncing states that help to thwart false triggering of force transients or idle conditions. If not dealt with, random noise and spikes on the measurement line that exceeds the specified noise margin will be interpreted as a transient and then integrated. Over long time periods this may appear as another form of drift. Instead, states 2 and 4 have counters that only allow transitions between states 1 and 3 when the required next state conditions are met for a user defined period of time. The timing is handled in software with counters that increment until a trip point is reached.

Figure 20:
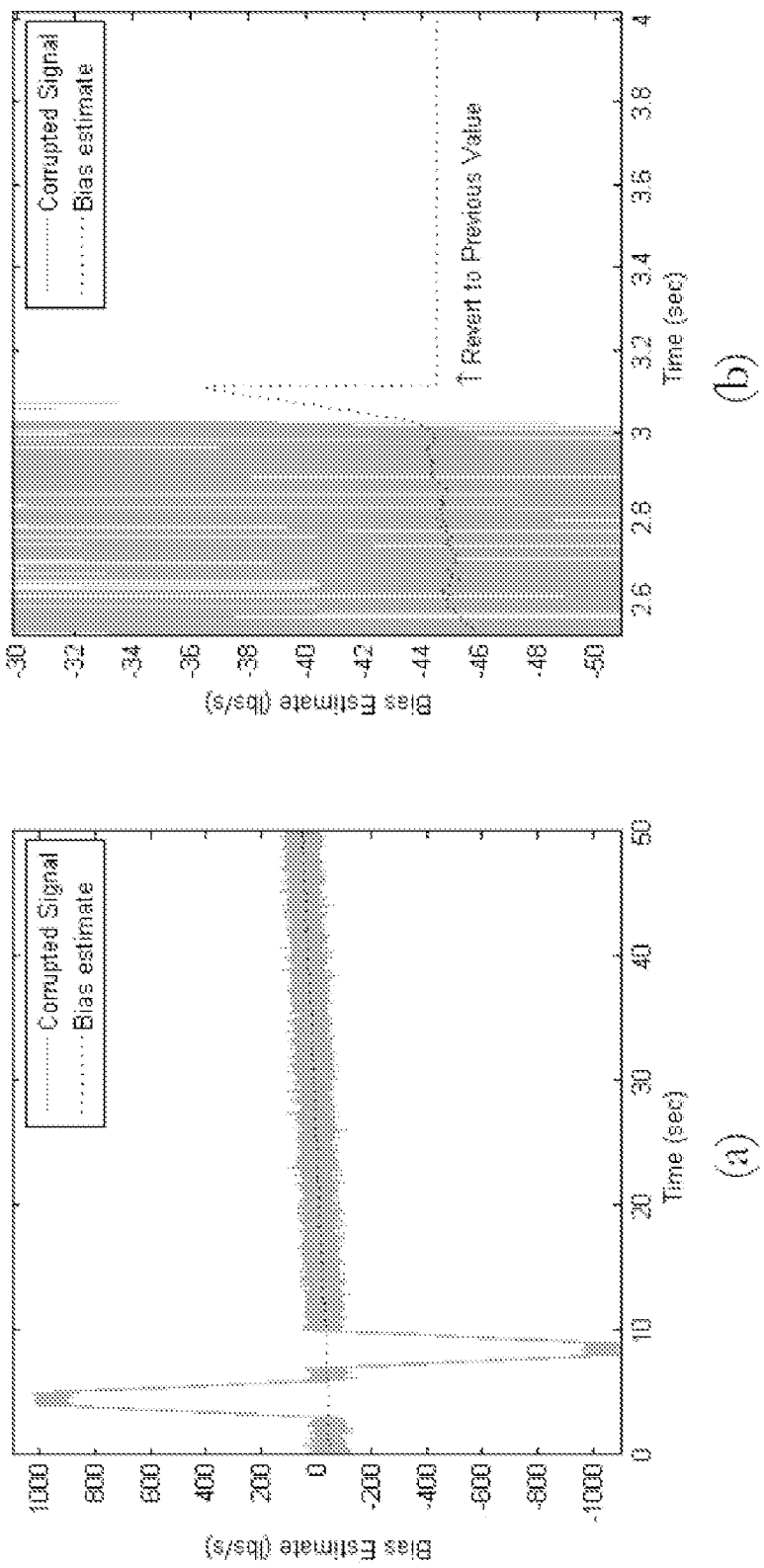
FIG. 20a illustrates a whole bias estimate for a state machine method.
FIG. 20b illustrates a zoomed-in bias estimate for a state machine method.

Further, the bias estimation happens at the transition from state 2 to 3. During the transition, the bias estimate is reset to a previous value of the estimate. In one example study, a time constant of ½ second was used for $\tau_2$ but values of $\frac{1}{10}$ to 1 second yield similar results to the study shown. Again, $\tau_1$ is infinity. The noise margin amplitude is 75 lbs/s. The trip value for state 2 counter is 5 ms and that of state 4 is 125 ms. These were chosen based upon experiment. In FIG. 20 the corrupted input used in the previous two studies is again utilized. FIG. 20a depicts the bias estimate over the whole time period of interest while FIG. 20b is a zoomed in view in time and magnitude. Specifically, b looks at the bias estimate at the time instant around 3 seconds when the first forced transient occurs. The estimate momentarily tracks the force, but then suddenly jumps back down. At this point in time, the state machine has transitioned from state 2 to 3, and the bias estimate has reverted back to a previous value. Thus, the bias estimate is less affected by the force transient with the state machine.

Figure 21:
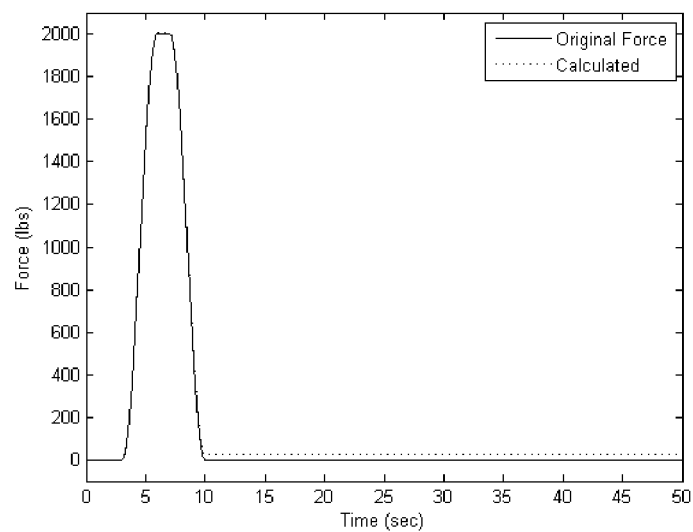
FIG. 21 illustrates a calculated force using a state machine method.
Figure 22:
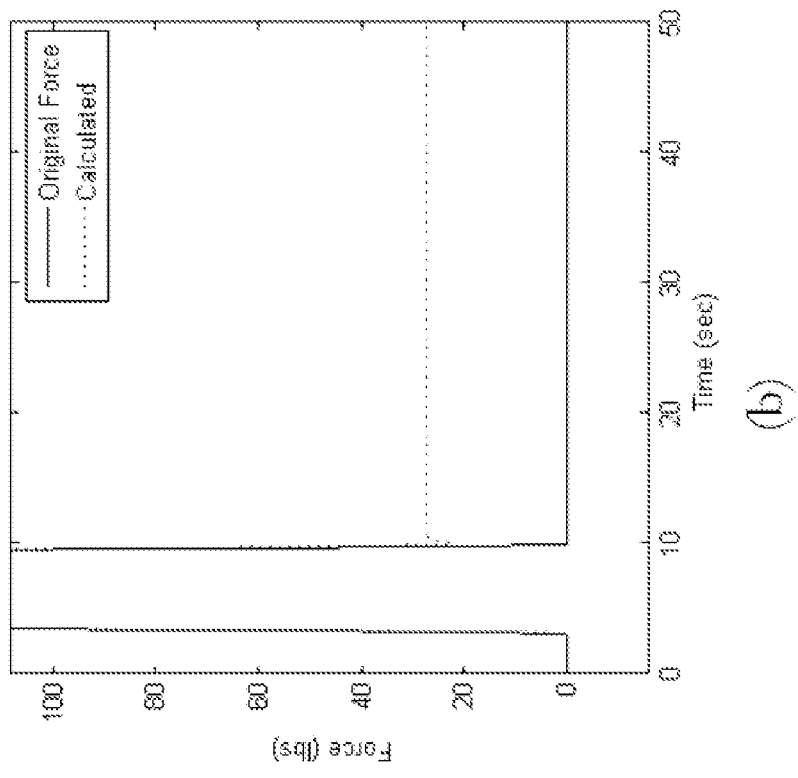
FIG. 22a illustrates a whole calculated force using a state machine method.
FIG. 22b illustrates a zoomed-in calculated force using a state machine method.
Figure 22:
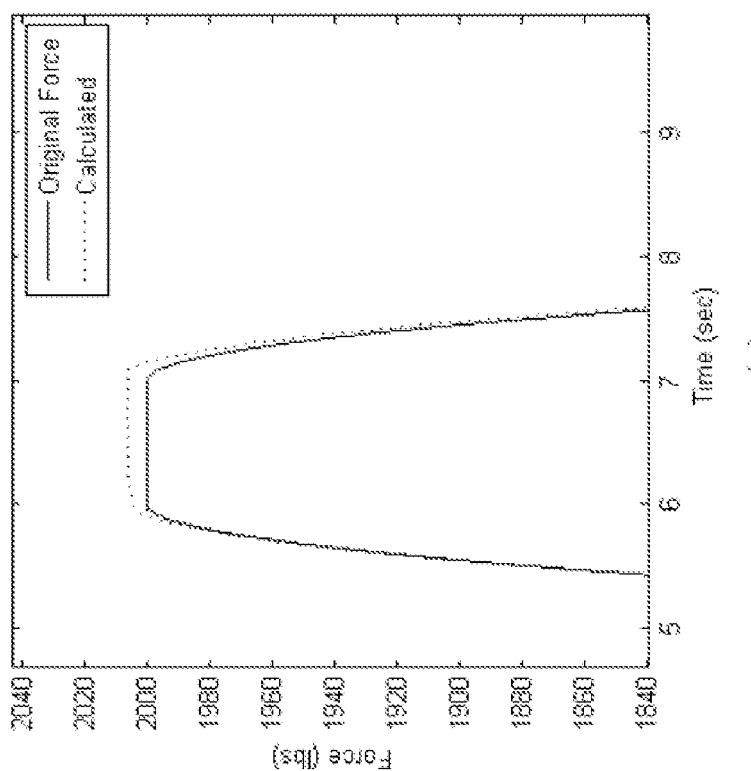

Additional results are shown in FIG. 21 The calculated force closely matches the force in the transient and is free of drift in the output for the remainder of the study. FIG. 22 provides more zoomed in views of the calculated force to better show the response. In FIG. 22a, the peak of the force transient is shown with very little error in contrast to the applied force. FIG. 22b shows the output unchanging after the transient finishes.

Figure 23:
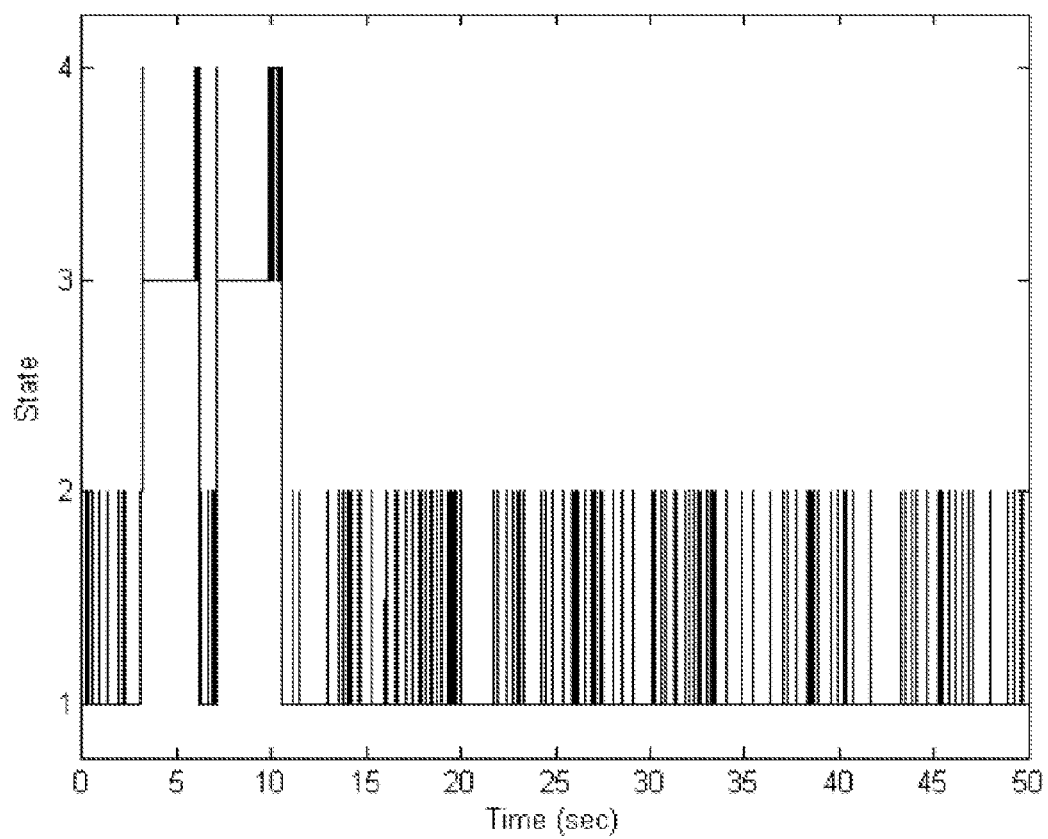
FIG. 23 illustrates a state position vs. time for a state machine method.

The drift shown in previous sections has now been removed completely as shown by FIG. 22b. With the integrator shut off in the idle state, phase shifts and numerical errors do not creep into the output. FIG. 23 shows the state position throughout the study. There are several instances before and after the transients that the position toggles between states 1 and 2. With state 2 acting to de-bounce a transient triggering event, the specified noise margin can be held fairly tight around the noise carried atop the input signal. In the same manner, the state position doesn't immediately change from tracking a transient in state 3 to the idle state 1 as soon as the input signal resides inside the boundaries of the noise margin. This is because the potential for lost integrating signal information could cause large steady state errors in the calculated force.

The noise should be characterized when calibrating the overall system. If the amplitude of the noise changes depending on its environment, a dynamically updated noise margin may be employed.

The digital charge amplifier, with its drift compensation algorithms, imposes certain limitations on the sensitivity of the system. Specifically, there is a minimum rate of change in force necessary for the switched and state machine bias estimation algorithms to detect a force transient. In this section the sensitivity is derived for these two bias estimation methods.

Figure 24:
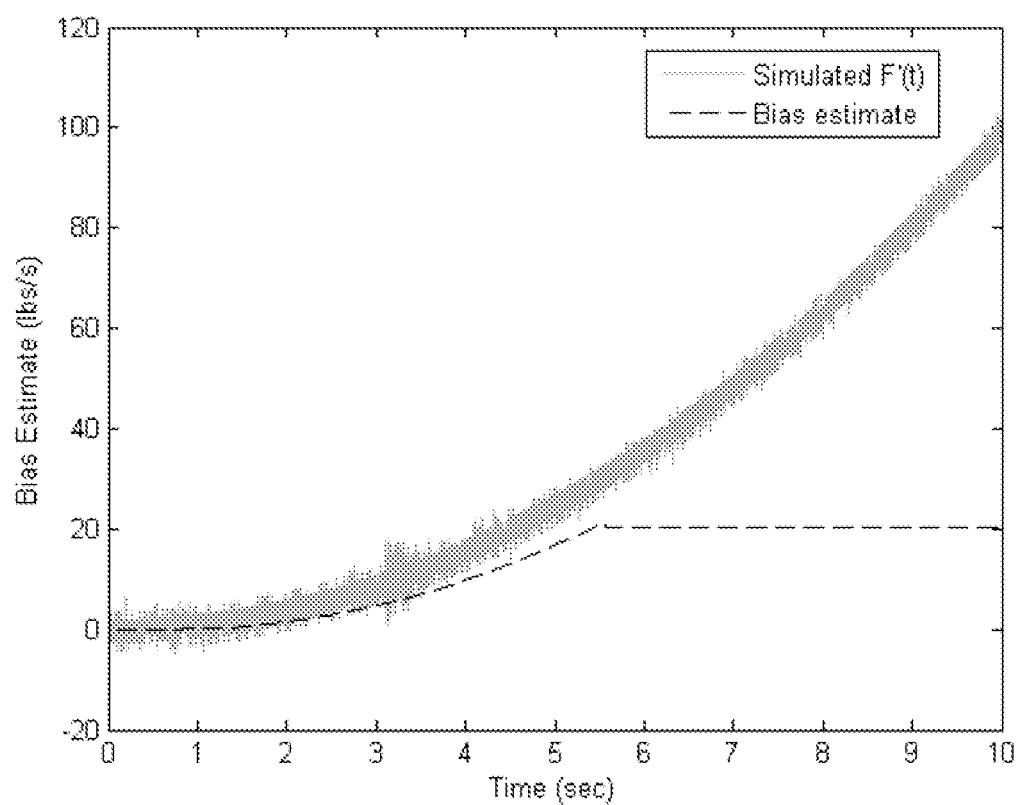
FIG. 24 illustrates a simulated derivative of force with bias estimation.
Figure 25:
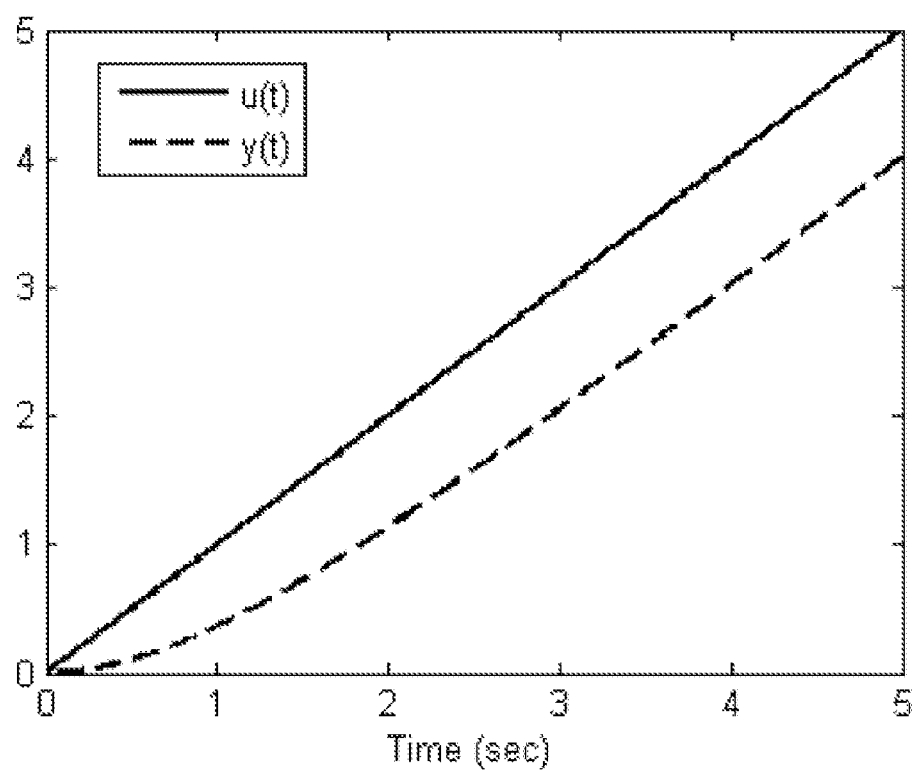
FIG. 25 illustrates a generic ramp function and a filtered signal.

The plot in FIG. 24 shows a simulated time derivative of the force, F'(t), compared to the bias estimate using the state machine method. The simulated F'(t) increases as a quadratic. The point at which the bias estimate stops increasing and the state machine assumes a transient force condition has arrived is depicted at around 5.5 seconds. The slope of the quadratic signal at this point is important. It signifies a sensitivity of the algorithm to small changing forces. In order for the algorithm to transition to a tracking state, a certain minimum second derivative of the force, F''(t), is required. If F''(t) is not sufficiently large enough, the bias estimate will assume the signal is noise and thus squelch it.

To mathematically determine the minimum slope required for the drift algorithm to switch to a tracking state, an example system is constructed. Given a first derivative force input, u(t), defined as $$u(t) = F''_{min} r(t) 1^+(t) \quad (17)$$

where $F''_{min}$ is the minimum required second derivative of force, r(t) is the ramp function and $1^+(t)$ is the unit step function. The Laplace transform of this signal is therefore $$u(s) = \frac{F''_{min}}{s^2} \quad (18)$$

With the drift algorithm in the idle state, the bias estimate will be the low pass filtered value of this input. The transfer function of the filter is given by Equation (19).

$$H(s) = \frac{1}{\tau_b s + 1} \quad (19)$$

The output bias estimate, y(s), is therefore $$y(s) = H(s)u(s) \quad (20)$$

$$\frac{1}{\tau_b s + 1} \frac{F''_{min}}{s^2}$$

$$F''_{min}\left(\frac{\tau^2}{\tau_b s + 1} - \frac{\tau_b}{s} + \frac{1}{s^2}\right)$$

In the time domain this is represented by $$y(t) = F''_{min}\left(\tau_b^2 e^{\frac{-1}{\tau}} - \tau_b + r(t)\right) 1^+(t) \quad (21)$$

The input and output traces of a generic signal are plotted in FIG. with a time constant of $\tau=1$ second and $F''_{min}=1$ lbs/s/s. The output, y(t), approaches a constant ramp function. In the steady state, the first term in Equation (21) drops out yielding Equation (22).

$$y_{s.s.}(t) = F''_{min}(r(t) - \tau_b) \quad (22)$$

The difference equation defined by Equation (15) in units of lbs/s then becomes $$\text{diff}_{s.s.}(t) = u(t) - y_{s.s.}(t) = F''_{min} \tau_b \quad (23)$$

This difference, once greater than the noise margin, causes a transition to a tracking state. Therefore, the minimum required second derivative of force is $$F''_{min} = \frac{NM}{\tau_b} \quad (24)$$

were NM is the noise margin in units of lbs/s.

Referring now to 26, a schematic of the analog and ADC portions of a DCA according to the present invention is shown. In order to maintain small amplitudes of voltage across the sensor, the disclosed circuit employs a shunt resistor value of 100 kΩ. To take full advantage of the measuring range of the analog to digital converter (ADC), an additional op amp scales the signal by a magnitude of 10. Because this specific ADC measures a range between 0-5 volts, an offset of 2.5 volts is added to the measured signal as well. This offset allows bipolar short circuit currents to be measured. R116 and C73 form the required low pass filter before sampling. With these values, the cut off frequency is approximately 33 Hz. The ADC has a resolution of 16 bits that equates to 76.3 µV per unit. The digital signal is then communicated to a microcontroller via a serial peripheral interface (SPI).

Figure 27:
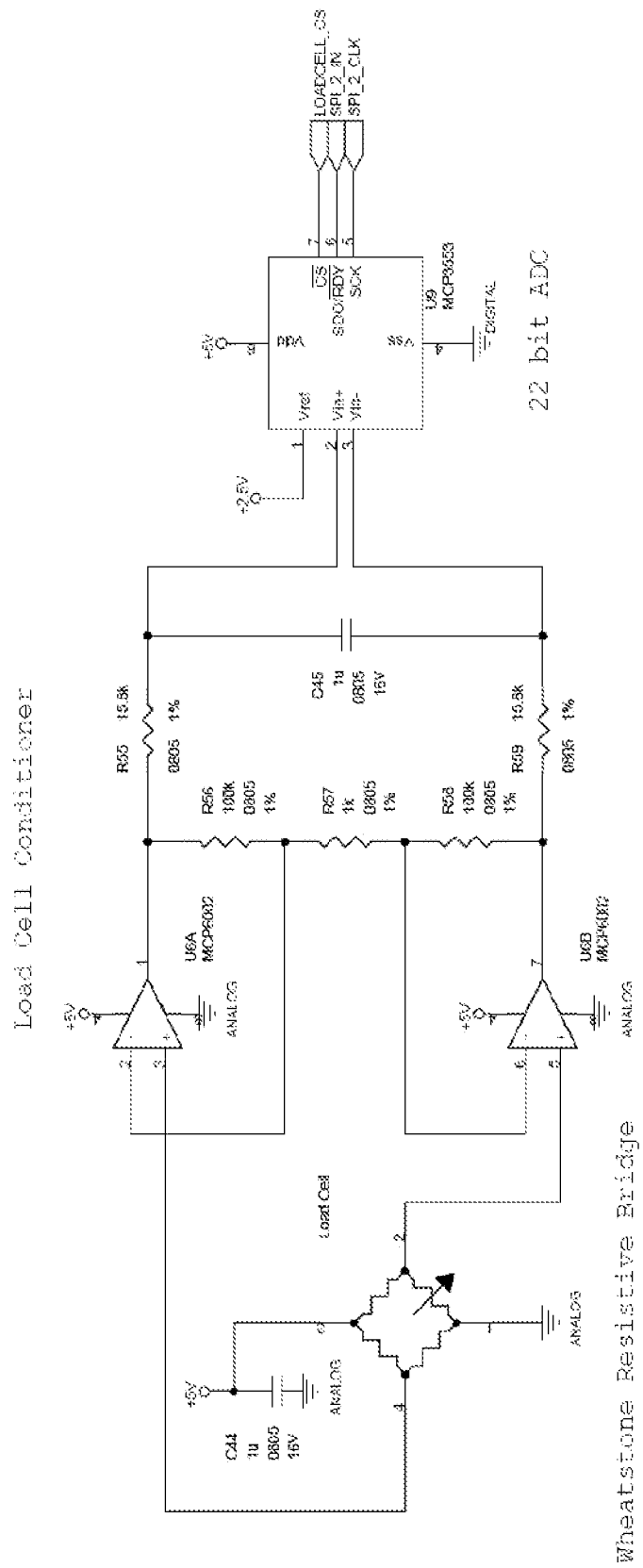
FIG. 27 illustrates a Wheatstone bridge amplifier and an analog-to-digital converter.

A commercial off the shelf load cell was used as a basis of comparison for the piezoelectric sensor. The cell incorporates a Wheatstone resistive bridge providing a differential signal. The cell is calibrated from Honeywell Sensotec with an output of 2 mV/V at a rated force of 10,000 lbs. With a given excitation of 5 volts, this produces 10 mV at rated force. FIG. 27 shows the differential instrument op amp configuration which provides a gain of 250. The signal is then sampled with a 22 bit ADC at a slower sampling rate of about 4 Hz.

Figure 26:
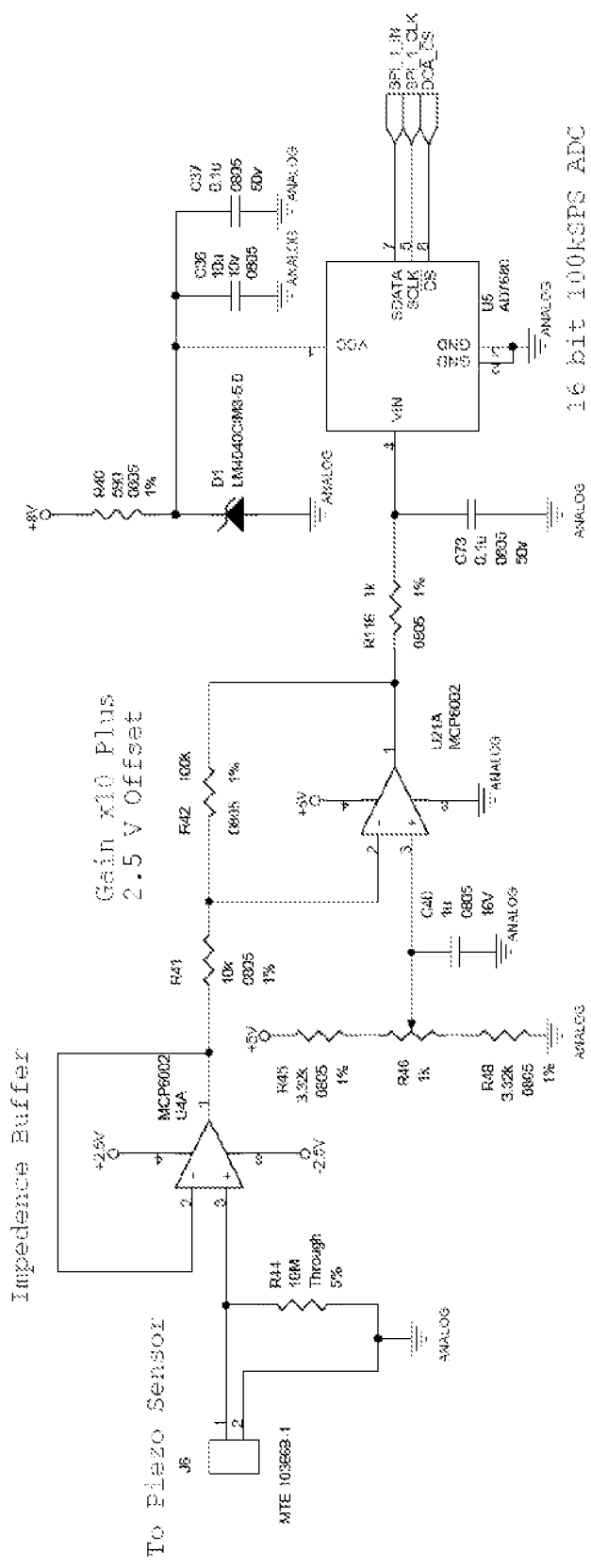
FIG. 26 illustrates a schematic of short circuit measurement chain of a digital charge amplifier.
Figure 28:
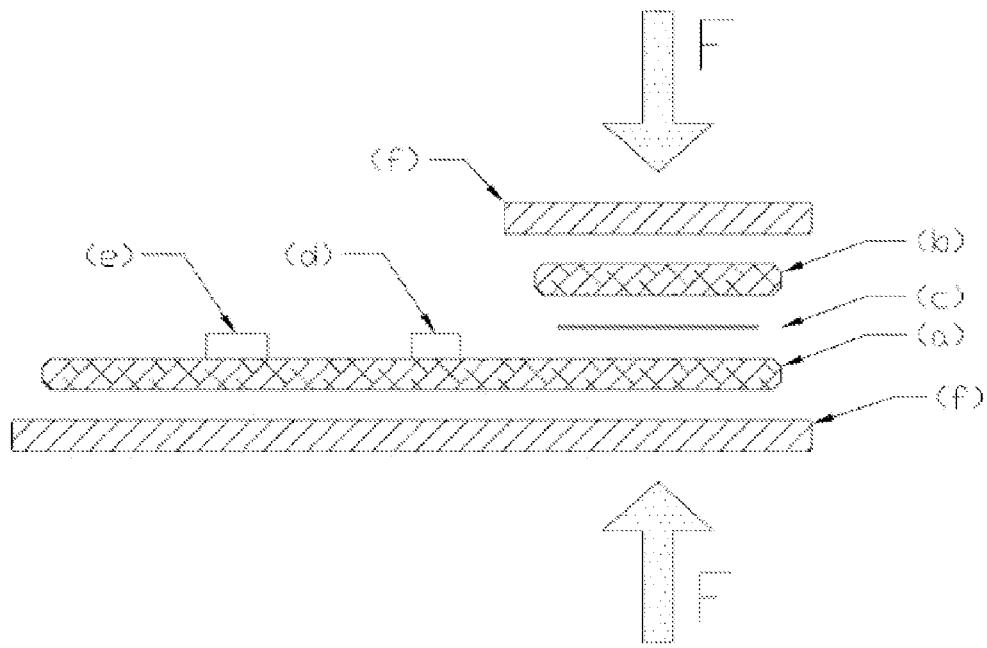
FIG. 28 illustrates a custom piezoelectric sensor housing with exploded view: (a, b) aluminum, (c) PVDF material, (d) temperature sensor, (e) power resistor, (f) UHMW plastic.

The piezoelectric sensor for one example of the DCA of FIG. 26 was PVDF with a thickness of 110 µm and electrodes of silver ink. The sensor, shown in FIG. 28, was cut from a sheet of this flexible material and the piezoelectric material was sandwiched between two blocks of aluminum and in turn sandwiched between blocks of UHMW plastic. The applied force to the sensor is through the vertical axis and is indicated by the arrows in the drawing.

Data logging with a personal computer is achieved via a serial port connection. The microcontroller used is a Microchip dsPIC30F5016, from Microchip's line of digital signal controllers that feature a 16 bit architecture that improves computational time of floating point numbers compared to 8 bit micros. A main interrupt loop is cycled at 1.131 kHz where the short circuit current is sampled and the DCA algorithm is updated. An example of source code for the microcontroller is documented in the Appendix.

Figure 29:
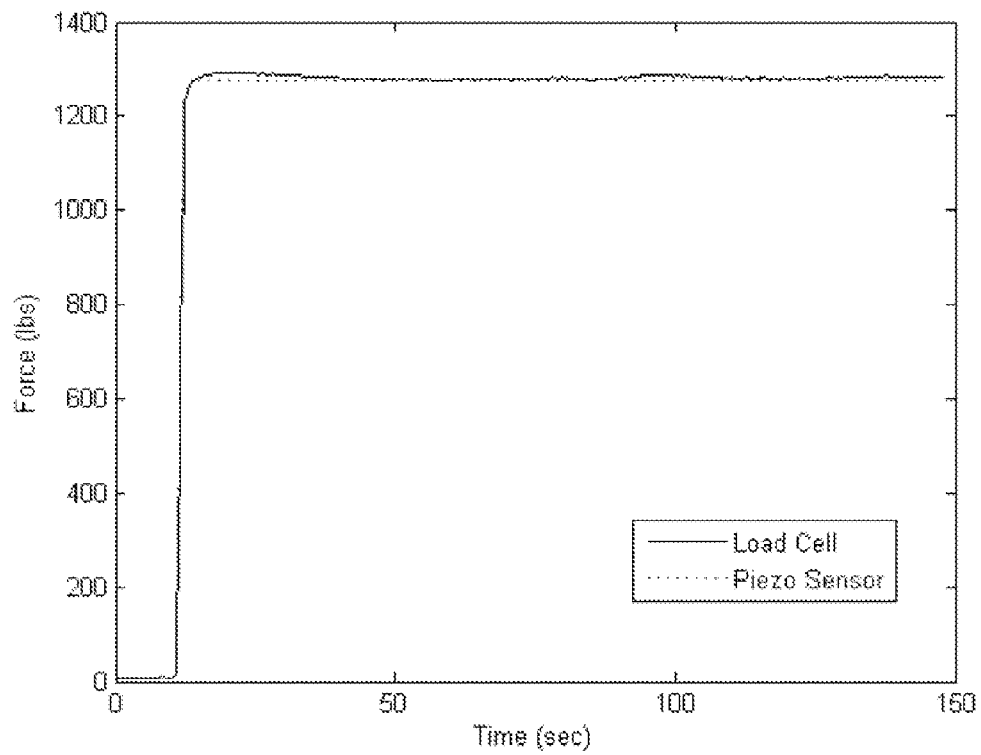
FIGS. 29-35 illustrate the results of experimental force profile studies.
Figure 30:
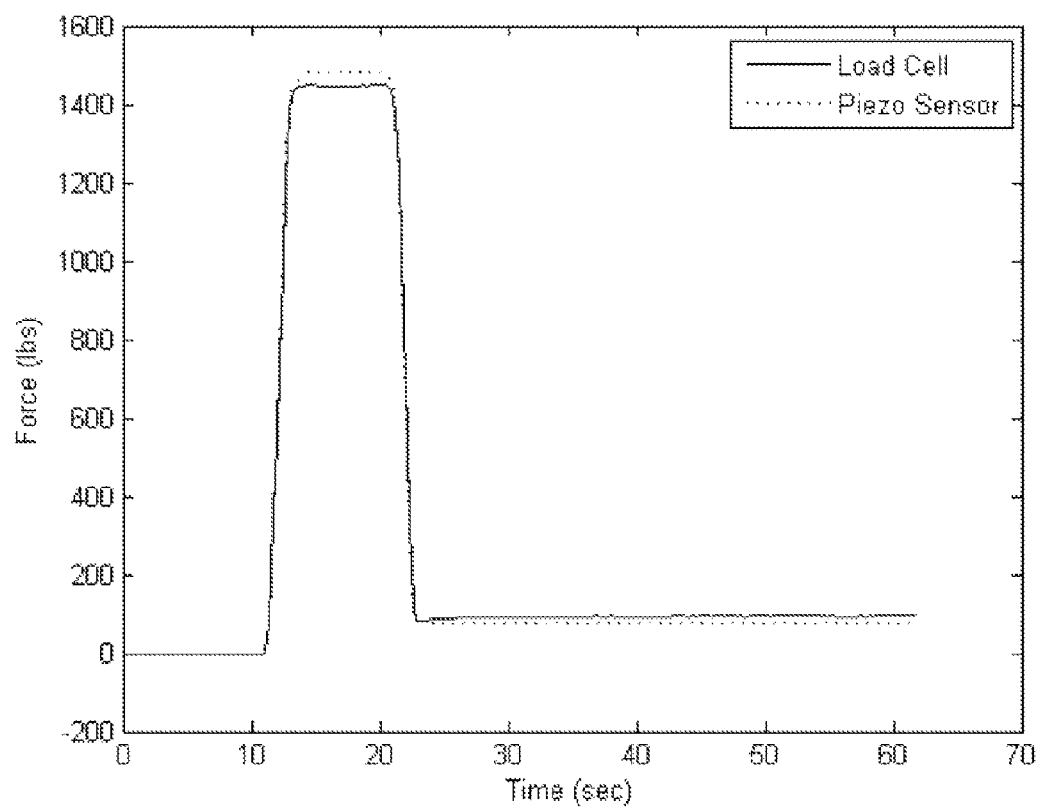
Figure 31:
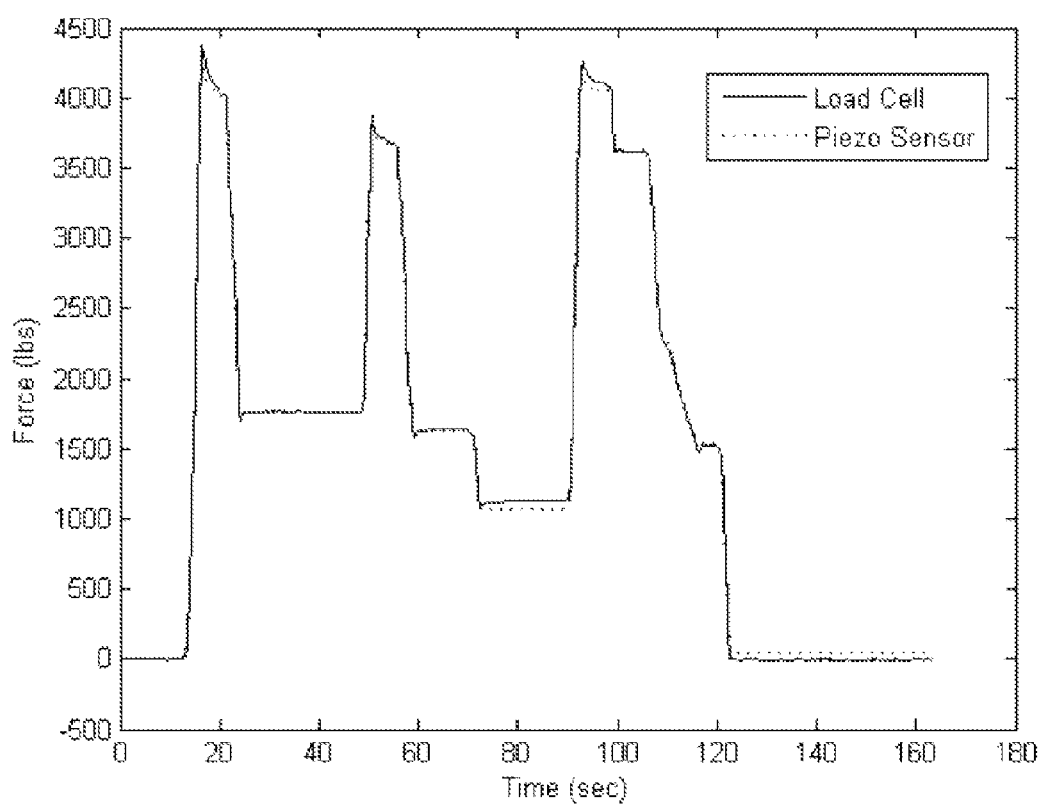
Figure 32:
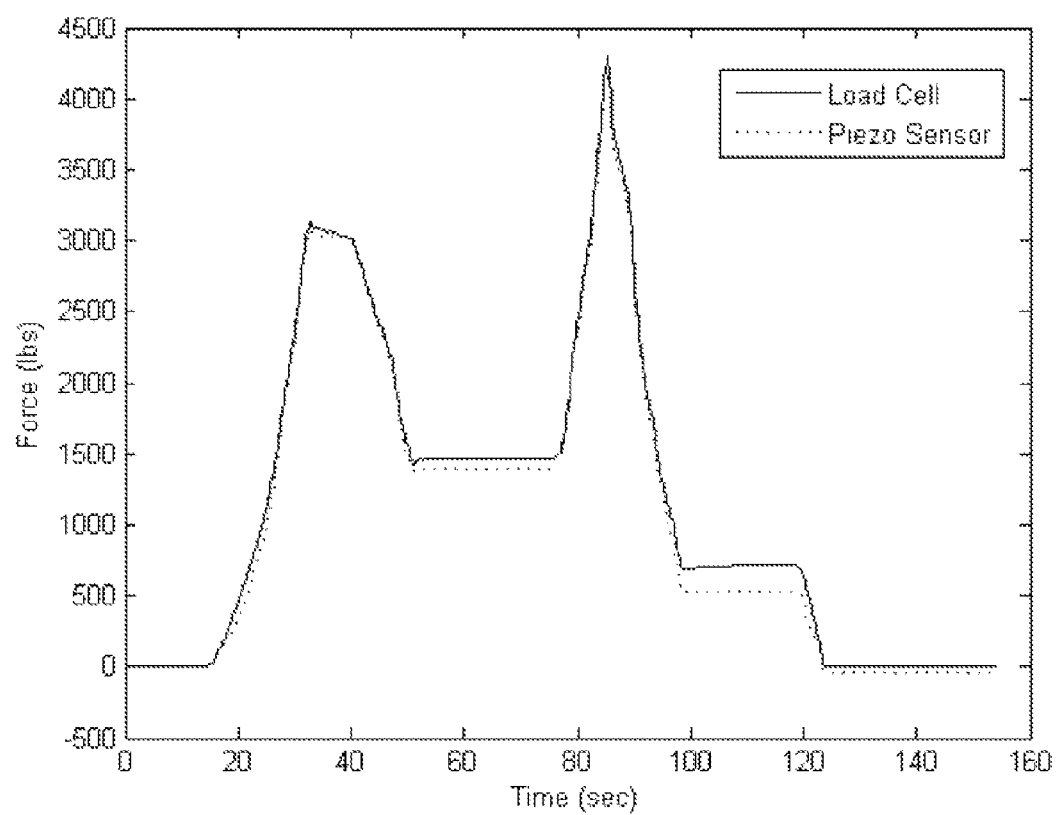
Figure 33:
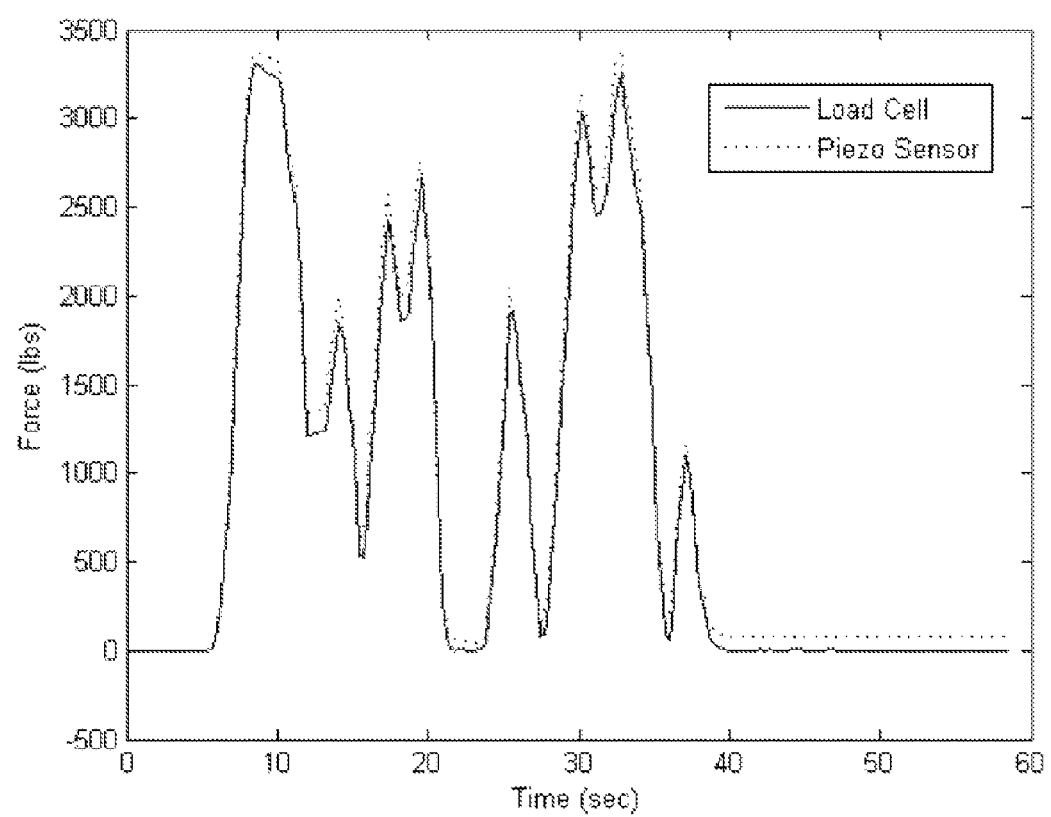
Figure 34:
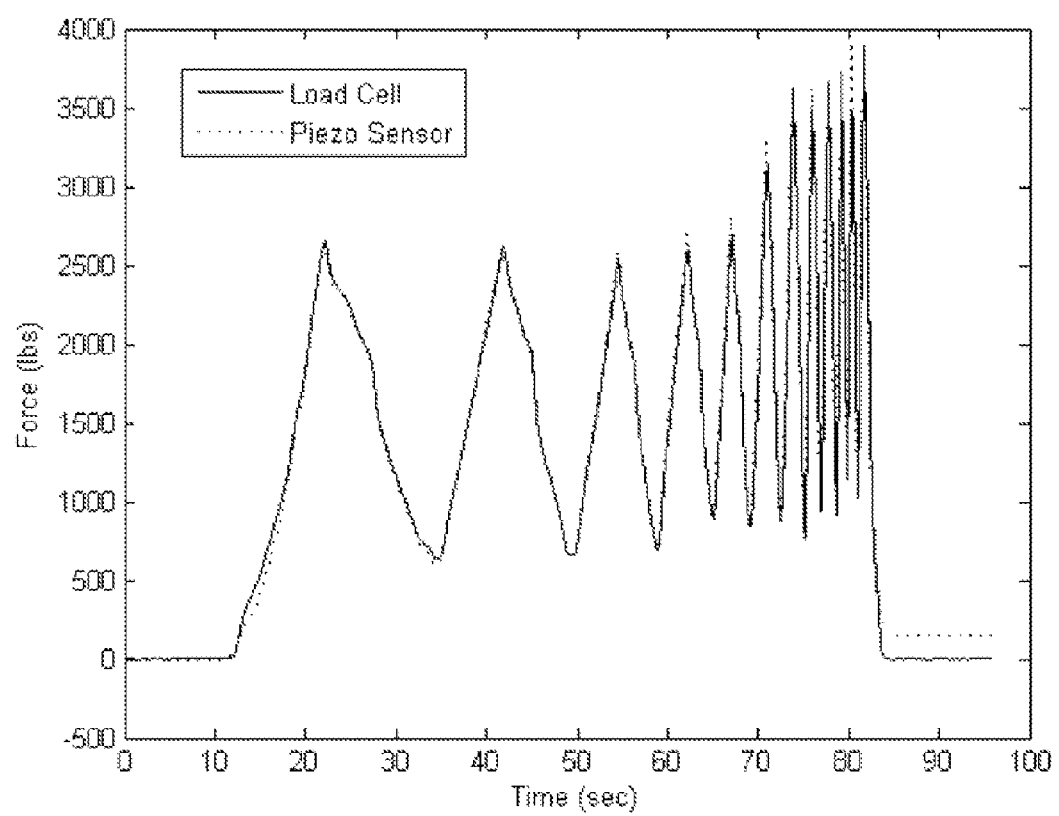

Several experimental studies were run with the load cell and piezoelectric sensor described above, compressed in a hand-operated press. FIG. 29 through FIG. 35 exhibit responses of the prototype DCA to various force profiles. In FIG. 29 a step load of force is applied and held constant. Notice that while constant, the DCA prevents any drifting to occur over the 150 second study. FIG. 30 shows another step up followed by a step down. FIG. 31 displays several step forces applied in succession, while FIG. 32 shows the response to ramping forces. FIG. 33 and FIG. 34 demonstrate the response of the DCA to more dynamic applied loads. In both cases, the final steady state value has some offset that has accumulated over time during the transients. This results from stopping integration within the noise margin.

Figure 35:
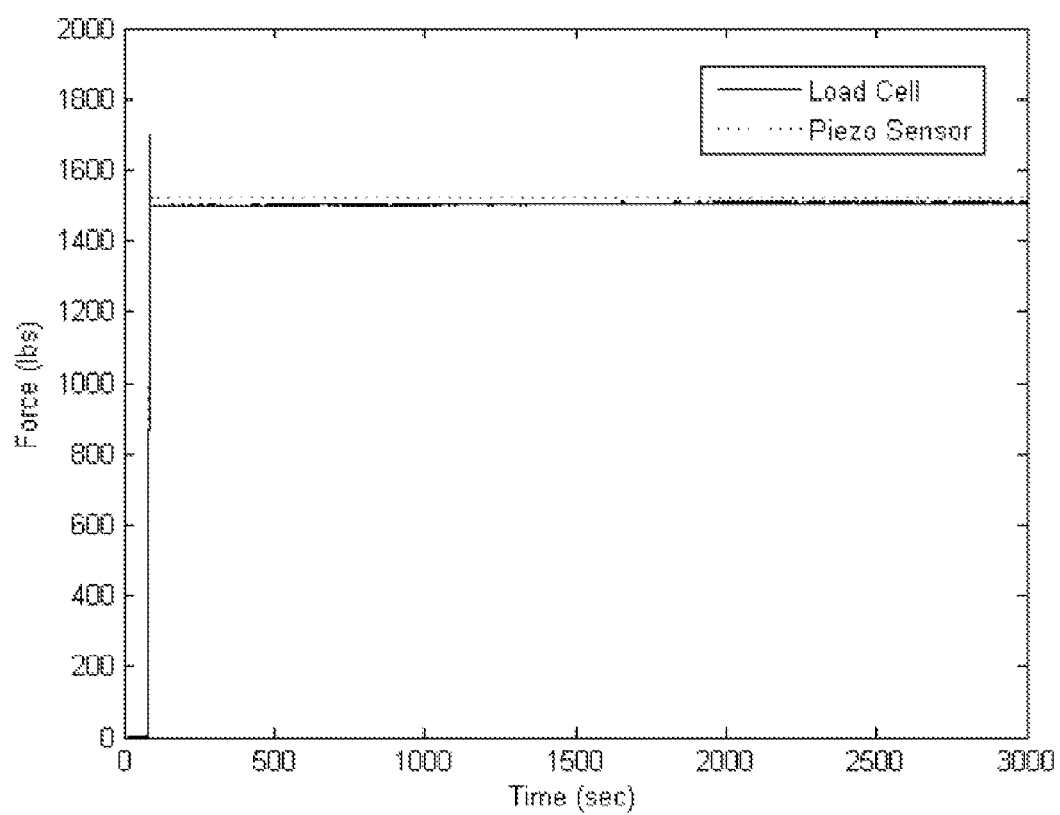

Another experiment was conducted to investigate the system response over longer periods of time. A mass that presents a force of 1,500 lbs due to gravity was placed on top of the sensor near the beginning of the test. The system was then left alone for about 3,000 seconds. As shown in FIG. 35, the calculated piezoelectric force using the DCA remains constant after the mass is applied, and no drift appears.

Although it has been shown that the steady state drift is eliminated, error still accumulates in the output over time, and so the initial reference point may be reset periodically or in response to certain conditions to improve the DCA performance in tracking the actual applied load. For example, if the system were applied to torque measurement of an electric drive, this reference point may be reset momentarily whenever zero torque is commanded to the machine drive with the machine at zero speed.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected.

```
%------------------------------------------------------------------------------
% Script:       DCA_Study_LPF.m
% Description:  Digital Charge Amplifier (DCA) simulation with low pass
%               filter (LPF) bias estimation algorithm
%------------------------------------------------------------------------------
clear; clc;
%parameters
load signal.mat;        %load simulated signal (make_signal.m)
h.gain=1.0;             %integration gain constant
h.nm=75.0e-3;           %noise margin amplitude for vo (V)
h.delt=1e-3;            %sampling period (seconds)
h.c2_trip=5;            %state 2 counter trip value (samples)
h.c4_trip=200;          %state 2 counter trip value (samples)
h.rl=125;               %bias remember length (how far back to remember
                        %a previous bias amount (samples)
h.sc=1000;              %scale to get back to lbs/s from voltage
%integrate the signal
h.tauLPF=500;
a = integ_lpf(h);
h.tauLPF=5e3;
b = integ_lpf(h);
h.tauLPF=50e3;
c = integ_lpf(h);
figure(1)
subplot(1,2,1)
plot(h.t,h.vo*h.sc,'Color', [.9 .9 .9]; hold on;
plot(h.t,a.vo_bias*h.sc,'k:',h.t,b.vo_bias*h.sc,'k--',h.t,c.vo_bias*h.sc,'k-.')
xlabel('Time (sec)'); ylabel('Bias Estimate (lbs/s)');
legend('Corrupted Signal','\tau_b=½ sec', ...
    '\tau_b=sec','\tau_b=sec');
zoom on;
subplot(1,2,2)
plot(h.t,h.vo*h.sc,'Color', [.9 .9 .9]); hold on;
plot(h.t,a.vo_bias*h.sc,'k:',h.t,b.vo_bias*h.sc,'k--',h.t,c.vo_bias*h.sc,'k-.')
xlabel('Time (sec)'); ylabel('Bias Estimate (lbs/s)');
legend('Corrupted Signal','\tau_b=½ sec', ...
    '\tau_b=sec','\tau_b=50 sec');
zoom on;
```

```
axis([2 12 −1100 1100]);
%resize figure window
p=get(1,'Position');
p(3)=1000; p(4)=400;
set(1,'Position',p);
figure(2)
plot(h.t,h.Flc,'k',h.t,a.Fp,'k:',h.t,b.Fp,'k--',h.t,c.Fp,'k-.')
% axis([0 50 −100 2100]);
xlabel('Time (sec)'); ylabel('Force (lbs)');
legend('Original Force','\tau_b=½ sec', . . .
    '\tau_b=5 sec','\tau_b=50 sec');
zoom on;
% figure(1)
% subplot(1,2,1);
% plot(h.t,h.df,'k'); axis([0 50 −1100 1100]);
% xlabel('Time (sec)'); ylabel('dF/dt (lbs/s)');
% subplot(1,2,2); plot(h.t,h.dfn,'k'); axis( [0 50 −1100 1100]);
% xlabel('Time (sec)'); ylabel('dF/dt (lbs/s)');
% %resize figure window
% p=get(1,'Position');
% p(3)=1000; p(4)=400;
% set(1, 'Position',p);
%
% plot(h.t,h.F1c,'k')
% xlabel('Time (sec)'); ylabel('Force (lbs)'); axis([0 50 −100 2100]);
%-----------------------------------------------------------------------
% Script:       DCA_Study_Switched.m
% Description:  Digital Charge Amplifier (DCA) simulation with switched
%               low pass filter (LPF) bias estimation algorithm
%-----------------------------------------------------------------------
clear; clc;
%parameters
load signal.mat;         %load simulated signal (make_signal.m)
h.gain=1.0;              %integration gain constant
h.nm=75.0e−3;            %noise margin amplitude for vo (V)
h.tauLPF=1000;           %low pass filter time constant (samples)
h.delt=1e−3;             %sampling period (seconds)
h.c2_trip=5;             %state 2 counter trip value (samples)
h.c4_trip=200;           %state 2 counter trip value (samples)
h.rl=125;                %bias remember length (how far back to remember
                         %a previous bias amount (samples)
h.sc=1000;               %scale to get back to lbs/s from voltage
%integrate the signal
h.tauLPF=100;
a = integ_switched(h);
h.tauLPF=500;
b = integ_switched(h);
% dF/dt -----------------------------------------------------------------
figure(1)
subplot(1, 2, 1)
plot(h.t,h.vo*h.sc,'Color', [.9 .9 .9]); hold on;
plot(h.t,a.vo_bias*h.sc,'k:',h.t,b.vo_bias*h.sc,'k--')
xlabel('Time (sec)'); ylabel('Bias Estimate (lbs/s)');
legend('Corrupted Signal','\tau_2=1/10 sec','\tau_2=½ sec');
axis( [0 50 −1100 1100]); zoom on;
subplot(1,2,2)
plot(h.t,h.vo*h.sc,'Color', [.9 .9 .9]); hold on;
plot(h.t,a.vo_bias*h.sc, 'k:', h.t,b.vo_bias*h.sc,'k--')
xlabel('Time (sec)'); ylabel('Bias Estimate (lbs/s)');
legend('Corrupted Signal','\tau_2=1/10 sec','\tau_2=½ sec');
axis([2 12 −140 80]); zoom on;
% %resize figure window
p=get(1, 'Position');
p(3)=1000; p(4)=400;
set(1,'Position',p);
% Fcalc -----------------------------------------------------------------
figure(2)
subplot(1, 2, 1)
plot(h.t,h.Flc,'k',h.t,a.Fp,'k:',h.t,b.Fp,'k--')
axis( [0 50 −100 2100]);
xlabel('Time (sec)'); ylabel('Force (lbs)');
legend('Original Force','\tau_2=1/10 sec','\tau_2=½ sec');
zoom on;
subplot(1,2,2)
plot(h.t,h.Flc,'k',h.t,a.Fp,'k:',h.t,b.Fp,'k--')
axis( [0 50 −100 2100]);
xlabel('Time (sec)'); ylabel('Force (lbs)');
legend('Original Force','\tau_2=1/10 sec','\tau_2=½ sec');
zoom on;
```

```
% %resize figure window
p=get(2,'Position');
p(3)=1000; p(4)=400;
set(2,'Position',p);
%----------------------------------------------------------------------------------------
% Script:       DCA_Study_State_Machine.m
% Description:  Digital Charge Amplifier (DCA) simulation with state machine
%               bias estimation algorithm
%----------------------------------------------------------------------------------------
clear; clc;
%parameters
load signal.mat;              %load simulated signal (make_signal.m)
h.gain=1.0;                   %integration gain constant
h.nm=75.0e-3;                 %noise margin amplitude for vo (V)
h.tauLPF=500;                 %low pass filter time constant (samples)
h.delt=1e-3;                  %sampling period (seconds)
h.c2_trip=5;                  %state 2 counter trip value (samples)
h.c4_trip=200;                %state 2 counter trip value (samples)
h.rl=125;                     %bias remember length (how far back to remember
                              %a previous bias amount (samples)
h.sc=1000;                    %scale to get back to lbs/s from voltage
h.kv=h.sc;
%integrate the signal
h = integ_state_machine(h);
% dF/dt ---------------------------------------------------------------------------------
figure(1)
subplot(1,2,1)
plot(h.t,h.vo*h.sc,'Color', [.9 .9 .9]); hold on;
plot(h.t,h.vo_bias*h.sc,' k:')
xlabel('Time (sec)'); ylabel('Bias Estimate (lbs/s)');
legend('Corrupted Signal','Bias estimate');
axis( [0 50 -1100 1100]); zoom on;
subplot(1,2,2)
plot(h.t,h.vo*h.sc,'Color', [.9 .9 .9]); hold on;
plot(h.t,h.vo_bias*h.sc, 'k:')
xlabel('Time (sec)'); ylabel('Bias Estimate (lbs/s)');
legend('Corrupted Signal','Bias estimate');
axis([2 12 -140 80]); zoom on;
% %resize figure window
p=get(1,'Position');
p(3)=1000; p(4)=400;
set(1,'Position',p);
% Fcalc---------------------------------------------------------------------------------
figure(2)
subplot(1,2,1)
plot(h.t,h.Flc,'k',h.t,h.Fp,'k:')
axis( [0 50 -100 2100]);
xlabel('Time (sec)'); ylabel('Force (lbs)');
legend('Original Force','Calculated');
zoom on;
subplot(1,2,2)
plot(h.t,h.Flc,'k',h.t,h.Fp,'k:')
axis( [0 50 -100 2100]);
xlabel('Time (sec)'); ylabel('Force (lbs)');
legend('Original Force','Calculated');
zoom on;
% %resize figure window
p=get(2,'Position');
p(3)=1000; p(4)=400;
set(2,'Position',p);
% State---------------------------------------------------------------------------------
figure(3)
plot(h.t,h.s,'k')
axis([0 50 0.75 4.25])
set(gca,'YTick',1:1:4)
set(gca,'YTickLabel',{'1', '2', '3', '4'})
xlabel('Time (sec)'); ylabel('State');
zoom on;
%----------------------------------------------------------------------------------------
% Functions
%----------------------------------------------------------------------------------------
function h = integ_lpf(h)
h.vo_bias=zeros(1,h.samps);        %create a bias estimation vector (V)
h.vo_bias(1)=mean(h.vo(1:50));     %obtain the first element (V)
h.alpha=exp(-1/h.tauLPF);          %low pass filter constant
h.Fp=zeros(1,h.samps);             %calculated piezoelectric force
for k=1:(h.samps-1)
    h.vo_bias(k+1)=h.alpha*h.vo_bias(k) + (1-h.alpha)*h.vo(k);
    h.Fp(k+1)=h.Fp(k)+h.gain*(h.vo(k)-h.vo_bias(k));
```

```
end
function h = integ_switched(h)
h.vo_bias=zeros(1,h.samps);           %create a bias estimation vector (V)
h.vo_bias(1)=mean(h.vo(1:50));        %obtain the first element (V)
h.alpha=exp(-1/h.tauLPF);             %low pass filter constant
h.Fp=zeros(1,h.samps);                %calculated piezoelectric force
for k=1:(h.samps-1)
    %calculate difference between measured vo and bias
    diff=abs(h.vo(k)-h.vo_bias(k));
    if diff < h.nm
        %here we are not outside the noise margine, so track the bias
        h.vo_bias(k+1)=h.alpha*h.vo_bias(k) + (1-h.alpha)*h.vo(k);
        %h.Fp(k+1)=h.Fp(k);
    else
        %we are outside the noise margin so integrate and fix the bias
        h.vo_bias(k+1)=h.vo_bias(k);
        %h.Fp(k+1)=h.Fp(k)+h.gain*(h.vo(k)-h.vo_bias(k));
    end
    h.Fp(k+1)=h.Fp(k)+h.gain*(h.vo(k)-h.vo_bias(k));
end
function h = integ_state_machine(h)
%initialize some vectors
h.vo_bias=zeros(1,h.samps);                   %create a bias estimation vector (V)
h.vo_bias(1:(h.r1+1))=mean(h.vo(1:h.r1));     %obtain the first element (V)
h.alpha=exp(-1/h.tauLPF);                     %low pass filter constant
h.Fp=zeros(1,h.samps);                        %calculated piezoelectric force
h.s=ones(1,h.samps);                          %state vector {1,2,3,4}
c2=0; c4=0;                                   %initialize state counters
%state machine
for k=(h.r1+1) : (h.samps-1)
    %calculate difference between measured vo and bias
    diff=abs(h.vo(k)-h.vo_bias(k));
    %assume at first that the new state will be the same as before
    h.s(k+1)=h.s(k);
    h.vo_bias(k+1)=h.vo_bias(k);
    h.Fp(k+1)=h.Fp(k);
    switch h.s(k)
        case 1
            %bias tracking state, no integration
            h.vo_bias(k+1)=h.alpha*h.vo_bias(k) + (1-h.alpha)*h.vo(k);
            %remember a previous bias value
            h.vo_bias_old=h.vo_bias(k-h.r1);
            %do we need to switch to state 2?
            if diff > h.nm
                h.s(k+1)=2;
            end
        case 2
            %if we are back within the bounds of the noise maring, go back
            %to state 1.
            if diff < h.nm
                c2=0;
                h.s(k+1)=1;
            end
            %increment timer
            c2=c2+1;
            if c2>h.c2_trip
                c2=0;
                h.s(k+1)=3;
                h.vo_bias(k+1)=h.vo_bias_old;       %recall a previous bias
            end
        case 3
            %recall a previous bias
            h.vo_bias(k+1)=h.vo_bias_old;
            %if we are bounded in
            if diff < h.nm
                h.s(k+1)=4;
            end
        case 4
            %recall a previous bias
            h.vo_bias(k+1)=h.vo_bias_old;
            %increment timer
            c4=c4+1;
            if diff > h.nm
                h.s(k+1)=3;
                c4=0;
            elseif c4<h.c4_trip
                h.s(k+1)=1;
                c4=0;
            end
```

```
    end
    %integrate if we are in state 3 or 4.
    if ((h.s(k) == 3) | | (h.s(k) == 4))
        h.Fp(k+1)=h.Fp(k)+h.kv*h.delt*(h.vo(k)−h.vo_bias(k));
    end
end
```

```
int main (void)
{
  unsigned char inchar;
  char x;
  int value;
  float tp;
  startup( );
  while(1)
  {
    while(!DataRdyUART1( ) );
    inchar = ReadUART1( );
    switch (inchar)
    {
      case 'j': { temp_star += 1; break;}
      case 'k': { temp_star −= 1; break;}
      case 'z': { Fp=0.0; break; }
      case 'n': {if(flag.neg) flag.neg=0; else flag.neg=1; break;}
      case 'b': {if(flag.burst) flag.burst=0; else flag.burst=1; break;}
      case 'd': {if(flag.disp) flag.disp=0; else flag.disp=1; break;}
      case 'f': {if(flag.formfeed) flag.formfeed=0; else flag.formfeed=1; break;}
      case 'h': {if(flag.heater) flag.heater=0; else flag.heater=1; break;}
      case 'l': {if(flag.lpf) flag.lpf=0; else flag.lpf=1; break;}
      case '1': { RELAY_ON; break;}
      case '2': { RELAY_OFF; break;}
      case 'r':
      {
        GREEN1_ON;
        flag.force_state=1;
        load_cell_offset = load_cell_data.dword;
        Fp=0.0;
        alpha=ALPHA_FAST;
        wait (250);
        alpha=ALPHA;
        flag.force_state=0;
        GREEN1_OFF;
        break;
      }
    }
  }
} /* main */
void record_bias (void)
{
  //record the value of bias values in circular buffer
  bias_buff[bias_buff_ptr] = (int) bias;
  bias_buff_ptr++;
  if (bias_buff_ptr >= BIAS_BUFFER_SIZE) { bias_buff_ptr=0; }
  //if we are in state 1, look at bias in past
  if (state == 1) {bias_old = (float) bias_buff[bias_buff_ptr]; }
} /* record_bias */
void __attribute__ ((__ interrupt__ )) _T3Interrupt(void)
{
  /* measure piezo */
  RED1_ON; RED2_ON;
  CLR_DCA_CS;
  piezo_data.byte[3] = 0;
  piezo_data.byte[2] = SPI1_data(0x00);
  piezo_data.byte[1] = SPI1_data(0x00);
  piezo_data.byte[0] = SPI1_data(0x00);
  SET_DCA_CS;
  piezo_data.dword = (piezo_data.dword)>>4;
  if(flag.burst)
  {
    put_hex((int)piezo_data.dword);
    putc_UART('\t');
    puts_UART(force_string);
    putc_UART('\t');
    puts_UART(temp_string);
    putc_UART('\r');
  }
```

```
RED1_OFF;
/* State Machine Integrator */
dfn = (float) piezo_data.dword;
diff = abs(dfn-bias);
switch(state)
{
   case 1:
      bias = alpha*bias + (1.0-alpha)*dfn;
      if (diff > NOISE_MARGIN) { state=2; }
      break;
   case 2:
      bias = bias_old;
      if (diff < NOISE_MARGIN) { state=1; c2=0; }
      c2++;
      if (c2>C2_TRIP) { state=3; c2=0; }
      break;
   case 3:
      bias = bias_old;
      if (diff < NOISE_MARGIN) { state=4; }
      break;
   case 4:
      bias = bias_old;
      c4++;
      if (diff > NOISE_MARGIN) { state=3; c4=0;}
      else if (c4 > C4_TRIP) { state=1; c4=0;}
      break;
}
if(flag.force_state) { state=1; c2=0; c4=0; }
record_bias( );
if ((state==3) | | (state==4)) {Fp = Fp + int_gain*(dfn-bias); }
RED2_OFF;
/* sample load cell, temperature, rms voltage */
load_cell_tmr ++;
if(load_cell_tmr >= 128)
{
   load_cell_tmr=0;
   if(LOADCELL_CS) {CLR_LOADCELL_CS;} //Toggle the chip select line
   else                               //Acquire sample from load cell every other
interrupt
   {
      load_cell_data.byte[3] = 0;
      load_cell_data.byte[2] = SPI2_data(0x00);
      load_cell_data.byte[1] = SPI2_data(0x00);
      load_cell_data.byte[0] = SPI2_data(0x00);
      SET_LOADCELL_CS;
      load_cell_data.dword = (load_cell_data.dword) <<11;
      /* enable timer one to interrupt right after this (uses lower priority */
      TMR1=0; IFS0bits.T1IF=0; IEC0bits.T1IE=1;
   }
}
IFS0bits.T3IF = 0;           //Clear Timer interrupt flag
} /* _T3Interrupt */
```

We claim:

1. A quasi-static piezoelectric force sensor, comprising:
a piezoelectric sensor;
a shunt resistor in parallel with said piezoelectric sensor, said shunt resistor having resistance several orders of magnitude smaller than that of said piezoelectric sensor and producing an analog voltage corresponding to the short-circuit current through said piezoelectric sensor;
an analog-to-digital converter (ADC) coupled to said shunt resistor so as to convert said analog voltage to a digital signal having digital values corresponding to respective instantaneous values of said analog voltage; and
a digital signal processor responsive to said ADC and configured to perform numerical integration of a digital signal derived therefrom.

2. The quasi-static piezoelectric force sensor of claim 1, wherein said digital signal processor is configured to implement a drift compensation algorithm which includes a switched bias estimator having a low-pass filter with a plurality of dynamically selectable time constants, said low-pass filter generating a bias value, said drift compensation algorithm further including means for selecting one of said time constants based on transient conditions of applied force, and means for subtracting said bias value from the output of said ADC.

3. The quasi-static piezoelectric force sensor of claim 2, wherein said bias estimator has a shorter time constant for small changes in applied force than for large changes in applied force.

4. The quasi-static piezoelectric force sensor of claim 3, wherein said bias estimator has a time constant of less than approximately one second for small changes in applied force.

5. The quasi-static piezoelectric force sensor of claim 2, wherein said switched bias estimator incorporates a state machine having first and second primary states associated with first and second time constants of said low-pass filter, and at least one holding state in which a transition between said primary states is inhibited for momentary changes in applied force.

6. The quasi-static piezoelectric force sensor of claim 5, wherein said state machine stores bias values and conditionally reverts to a previous bias value for subtraction from the current output of said ADC.

7. A quasi-static piezoelectric force sensor, comprising:
a piezoelectric sensor;
an analog-to-digital converter (ADC) having an input coupled to said piezoelectric sensor and configured to convert an analog signal therefrom to a digital signal representative of force sensed by said piezoelectric sensor; and
a digital signal processor having an input coupled to an output of said ADC and configured to perform numerical integration of a digital signal derived therefrom, said digital signal processor configured to implement a drift compensation algorithm and to produce an output signal representative of quasi-static force.

8. The quasi-static piezoelectric force sensor of claim 7, wherein said drift compensation algorithm includes a switched bias estimator having a low-pass filter with a plurality of dynamically selectable time constants, said low-pass filter generating a bias value, said drift compensation algorithm further including means for selecting one of said time constants based on transient conditions of applied force, and means for subtracting said bias value from the output of said ADC.

9. The quasi-static piezoelectric force sensor of claim 8, wherein said bias estimator has a shorter time constant for small changes in applied force than for large changes in applied force.

10. The quasi-static piezoelectric force sensor of claim 9, wherein said bias estimator has a time constant of less than approximately one second for small changes in applied force.

11. The quasi-static piezoelectric force sensor of claim 8, wherein said switched bias estimator incorporates a state machine having first and second primary states associated with first and second time constants of said low-pass filter, and at least one holding state in which a transition between said primary states is inhibited for momentary changes in applied force.

12. The quasi-static piezoelectric force sensor of claim 11, wherein said state machine stores bias values and conditionally reverts to a previous bias value for subtraction from the current output of said ADC.

* * * * *